United States Patent
Jung et al.

(10) Patent No.: US 12,133,536 B2
(45) Date of Patent: Nov. 5, 2024

(54) FOOD PRODUCT COATINGS

(71) Applicant: Oregon State University, Corvallis, OR (US)

(72) Inventors: Jooyeoun Jung, Lincoln, NE (US); John Simonsen, Corvallis, OR (US); Yanyun Zhao, Beaverton, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 16/526,377

(22) Filed: Jul. 30, 2019

(65) Prior Publication Data

US 2019/0364916 A1 Dec. 5, 2019

Related U.S. Application Data

(63) Continuation of application No. PCT/US2018/016021, filed on Jan. 30, 2018.

(60) Provisional application No. 62/452,897, filed on Jan. 31, 2017.

(51) Int. Cl.
*A23B 7/16* (2006.01)
*B82Y 40/00* (2011.01)
*C08L 1/02* (2006.01)
*C08L 5/08* (2006.01)

(52) U.S. Cl.
CPC .......... *A23B 7/16* (2013.01); *C08L 1/02* (2013.01); *C08L 5/08* (2013.01); *B82Y 40/00* (2013.01)

(58) Field of Classification Search
CPC ......... C09D 101/02; A23B 7/16; A23B 7/154; C08L 1/02; C08L 5/08; B82Y 40/00
USPC ....................................................... 426/323
See application file for complete search history.

(56) References Cited

U.S. PATENT DOCUMENTS

| | | | |
|---|---|---|---|
| 4,338,342 A | * | 7/1982 | Tan .......................... A23B 7/16 426/308 |
| 4,572,906 A | | 2/1986 | Sparkes et al. |
| 4,649,057 A | | 3/1987 | Thomson |
| 4,783,342 A | | 11/1988 | Polovina |
| 5,047,180 A | | 9/1991 | Steiner et al. |
| 6,060,521 A | | 5/2000 | Sekutowski et al. |
| 6,162,475 A | | 12/2000 | Hagenmaier et al. |

(Continued)

FOREIGN PATENT DOCUMENTS

| | | |
|---|---|---|
| CN | 1212067 | 7/2005 |
| CN | 105211276 | 1/2016 |

(Continued)

OTHER PUBLICATIONS

CN1466883 (A)—Machine translation of abstract and description (Year: 2004).*

(Continued)

*Primary Examiner* — Subbalakshmi Prakash
(74) *Attorney, Agent, or Firm* — Klarquist Sparkman, LLP

(57) ABSTRACT

Disclosed herein are embodiments of a coating composition comprising cellulose nanomaterials and emulsion systems. The coating compositions provide improved moisture barrier and wettability onto fruit surfaces and can control physiological activity and enhance storability of food products, such as fruits during ambient storage. Also disclosed herein are embodiments of dried and substantially dried coatings, films, products made with the coating compositions, and methods of making and using the coating compositions described herein.

28 Claims, 11 Drawing Sheets

(56) References Cited

U.S. PATENT DOCUMENTS

| | | | |
|---|---|---|---|
| 6,284,278 | B1 | 9/2001 | Waldman et al. |
| 6,312,669 | B1 | 11/2001 | Cantiani |
| 6,348,436 | B1 | 2/2002 | Langlois |
| 6,548,170 | B2 | 4/2003 | Perrier et al. |
| 6,703,340 | B2 | 3/2004 | Yang |
| 6,730,340 | B1 | 5/2004 | MacQuarrie et al. |
| 6,857,224 | B1 | 2/2005 | Kammereck et al. |
| 7,105,229 | B2 | 8/2006 | Anderson |
| 7,153,353 | B2 | 12/2006 | Ichinohe |
| 7,157,113 | B2 | 1/2007 | Machielse et al. |
| 7,160,580 | B2 | 1/2007 | Hettiasrachchy et al. |
| 7,222,455 | B2 | 5/2007 | Schrader |
| 8,752,328 | B2 | 6/2014 | Kaiser et al. |
| 2004/0077498 | A1 | 4/2004 | Lynch |
| 2005/0113255 | A1 | 5/2005 | Schrader et al. |
| 2006/0252649 | A1 | 11/2006 | Pluta et al. |
| 2007/0037711 | A1 | 2/2007 | Pluta et al. |
| 2007/0135312 | A1 | 6/2007 | Melbouci |
| 2007/0190097 | A1 | 8/2007 | Schrader |
| 2009/0196908 | A1 | 8/2009 | Lee et al. |
| 2011/0036522 | A1 | 2/2011 | Ankerfors et al. |
| 2011/0198282 | A1 | 8/2011 | Chu et al. |
| 2011/0223401 | A1 | 9/2011 | Harlin et al. |
| 2012/0015852 | A1 | 1/2012 | Quintero et al. |
| 2012/0042420 | A1 | 2/2012 | Kaiser et al. |
| 2012/0043039 | A1 | 2/2012 | Paltakari et al. |
| 2012/0153214 | A1 | 6/2012 | Boluk |
| 2013/0061774 | A1 | 3/2013 | Landry et al. |
| 2014/0272013 | A1 | 9/2014 | Zhao et al. |
| 2016/0002483 | A1 | 1/2016 | Zhao et al. |

FOREIGN PATENT DOCUMENTS

| | | |
|---|---|---|
| EP | 1 654 933 | 5/2006 |
| JP | 53-62855 | 6/1978 |
| JP | 03-139248 | 6/1991 |
| JP | 2013541544 | 11/2013 |
| KR | 101622441 | 5/2016 |
| WO | WO 2009/064450 | 5/2009 |
| WO | WO 2010/066036 | 6/2010 |
| WO | WO 2011/047047 | 4/2011 |
| WO | WO 2011/139749 | 11/2011 |
| WO | WO 2011/141877 | 11/2011 |
| WO | WO 2013/009253 | 1/2013 |
| WO | WO 2013/061266 | 5/2013 |

OTHER PUBLICATIONS

Supplemental European Search Report issued by European Patent Office for EPC Application No. 18748824.2 on Aug. 4, 2020.
Azeredo et al., "Nanocomposite edible films from mango puree reinforced with cellulose nanofibers," *Journal of Food Science*, 74(5): N31-N35, May 18, 2009.
Lalel et al., "Maturity stage at harvest affects fruit ripening, quality and biosynthesis of aroma volatile compounds in 'Kensington Pride' mango," *The Journal of Horticultural Science and Biotechnology*, 78(2): 225-233, Nov. 7, 2015.
Shibahara et al., "cis-Vaccenic acid in mango pulp lipids," *Lipids*, 21(6): 388-394, Jun. 1986.
Correa, "Riqueza Quimica Del Mango" *Revista Universidad Y Eafit*, 27(83): 77-82, Aug. 27, 2012.
Chilean Office Action issued on Oct. 14, 2020, for corresponding Chilean Application No. 201902128.
Andrade et al., "Atomizing Spray Systems for Application of Edible Coatings," *Comprehensive Reviews in Food Science and Food Safety*, vol. 11, pp. 323-337, Apr. 9, 2012.
Aulin et al., "Oxygen and oil barrier properties of microfibrillated cellulose films and coatings," *Cellulose*, 17(3): 559-574, Jan. 10, 2010.
Azeredo et al., "Edible films from alginate-acerola puree reinforced with cellulose whiskers," *LWT—Food Science and Technology*, 46:294-297, Apr. 2012.

Azeredo et al., "Nanocellulose Reinforced Chitosan Composite Films as Affected by Nanofiller Loading and Plasticizer Content," *Journal of Food Science*, 75(1): N1-N7, Jan. 2010.
Azeredo et al., "Nanoreinforced alginate-acerola puree coatings on acerola fruits," *Journal of Food Engineering*, 113:505-510, Aug. 11, 2012.
Baldwin, "Surface treatment and edible coatings in food preservation," *Handbook of Food Preservation*, Boca Raton, LA, USA, CRC Press, Chapter 21, pp. 477-507, 2007.
Belbekhouche et al., "Water sorption behavior and gas barrier properties of cellulose whiskers and microfibrils films," *Carbohydrate Polymers*, 83(4): 1740-1748, Feb. 1, 2011.
Bilbao-Sanz et al., "Composite Edible Films Based on Hydroxypropyl Methylcellulose Reinforced with Microcrystalline Cellulose Nanoparticles," *J. Agric. Food Chem.*, 2010, 58(6), pp. 3753-3760, Feb. 25, 2010.
Brown et al., "Effects of copper-calcium sprays on fruit cracking in sweet cherry (*Prunus avium*)," *Scientia Horticulturae*, 62:75-80, Apr. 1995.
Casariego et al., "Chitosan coating surface properties as affected by plasticizer, surfactant and polymer concentrations in relations to the surface properties of tomato and carrot," *Food Hydrocolloids*, 22(8): 1452-1459, Dec. 2008.
Chen et al., "Dispersion Process and Effect of Oleic Acid on Properties of Cellulose Sulfate-Oleic Acid Composite Film," *Materials*, vol. 8, pp. 2346-2360, Apr. 30, 2015.
Choi et al., "Wettability of chitosan coating solution on 'Fuji' apple skin," *Journal of Food Science*, 67(7): 2668-2672, Sep. 2002.
De Moura et al., Microfluidizer Technique for Improving Microfiber Properties Incorporated Into Edible and Biodegradable Films, *Advances in Microfluidics*, Dr. Ryan Kelly, Ed., Chapter 10, pp. 219-240, Mar. 2012.
Deng et al., "Development, characterization, and validation of chitosan adsorbed cellulose nanofiber (CNF) films as water resistant and antibacterial food contact packaging," *LWT—Food Science and Technology*, vol. 83, pp. 132-140, May 13, 2017.
Fakhouri et al., "Effect of a gelatin-based edible coating containing cellulose nanocrystals (CNC) on the quality and nutrient retention of fresh strawberries during storage," *IOP Conf. Series: Materials Science and Engineering*, 2014, 64, Jan. 20, 2024, Aug. 22, 2014, (7 pages: doi:10.1088/1757-899X/64/1/012024).
George et al., "High performance nanocomposite films containing bacterial cellulose nanocrystals," *Carbohydrate Polymers*, 87(3): 2031-2037, Oct. 14, 2011.
Hasan, "Development of Chitosan Based Film Enhanced with Nanocellulose Fibre Extracted from Oil Palm Empty Fruit Bunch (OPEFB)," *Thesis submitted in fulfillment of requirement for award of degree Bachelor of Engineering*, Jul. 5, 2013, 17 Pages (pp. ii, vi-viii, ix-xi, 51-60).
Hu et al., "Surfactant-enhanced cellulose nanocrystal pickering emulsions," *Journal of Colloid and Interface Science*, vol. 439, pp. 139-148, Oct. 29, 2014.
International Preliminary Report on Patentability issued for International Application No. PCT/US2018/016021 on Jan. 30, 2019.
International Search Report and Written Opinion issued for International Application No. PCT/US2014/029611 on May 19, 2014.
International Search Report and Written Opinion issued for International Application No. PCT/US2018/016021 on Mar. 29, 2018.
Jahit et al., "Preparation and physical properties of gelatin-CMC/chitosan composite films as affected by drying temperature," *International Food Research Journal*, 23(3): 1068-1074, Jan. 2016.
Jiang et al., "Effect of chitosan coating on postharvest life and quality of longan fruit," *Food Chemistry*, 73:139-143, Apr. 3, 2001.
Jung et al. "Investigation of the Mechanisms of Using Metal Complexation and Cellulose Nanofiber/Sodium Alginate Layer-by-Layer Coating for Retaining Anthocyanin Pigments in Thermally Processed Blueberries in Aqueous Media," *Journal of Agricultural and Food Chemistry*, 63(11): pp. 3031-3038, Mar. 16, 2015.
Kaiser et al., "A Review of Cherry Fruit Cracking," http://extension.oregonstate.edu/umatilla/mf/sites/default/files/WA_State_Cherry_Cracking_Kaiser_Dec_07, published on-line at least as early as Dec. 2007 (26 pages).

(56) References Cited

OTHER PUBLICATIONS

Khalifa et al., "Improving the shelf-life stability of apple and strawberry fruits applying chitosan-incorporated olive oil processing residues coating," *Food Packaging and Shelf-Life*, vol. 9, pp. 10-19, Sep. 2016.
Khan et al., "Mechanical and barrier properties of nanocrystalline cellulose reinforced chitosan based nanocomposite films," *Carbohydrate Polymers*, vol. 90, pp. 1601-1608, Jul. 16, 2012.
Khan et al., "Production and properties of Nanocellulose-Reinforced Methylcellulose-Based Biodegradable Films," *Journal of Agricultural and Food Chemistry*, vol. 58, pp. 7878-7885, Jun. 15, 2010.
Khuwijitjaru et al., "Preparation of finely dispersed O/W emulsion from fatty acid solubilized in subcritical water," *Journal of Colloid and Interface Science*, vol. 278, pp. 192-197, Oct. 2004.
Lacroix et al., "Edible films and coatings from non-starch polysaccharides," *Innovations in Food Packaging*, ed. Han, 2005.
Maftoonazad et al., "Postharvest shelf life of avocados using methyl cellulose-based coating," *LWT*, 38: 617, 624, Nov. 17, 2004.
Maqbool et al., "Effect of a novel edible composite coating based on gum Arabic and chitosan on biochemical and physiological responses of banana fruits during cold storage," *Journal of Agricultural and Food Chemistry*, 59(10): 5474-5482, Apr. 8, 2011.
Marathe, *Development of Controlled Release Antimicrobial Films from Low Methoxyl Pectin*, Thesis submitted to the Rutgers, The State University of New Jersey, Jan. 2008.
Marpudi et al., "Enhancement of storage life and quality maintenance of papaya fruits using aloe vera based antimicrobial coating," *Indian Journal of Biotechnology*, vol. 10, 6 pages, Jan. 2011.
Martinez-Romero et al., "Postharvest sweet cherry quality and safety maintenance by *Aloe vera* treatment: A new edible coating," *Postharvest Biology and Technology*, 39(1): 93-100, Jan. 2006.
Morris, "Synthesis of an Antimicrobial Textile Coating," Department of Chemistry and Biochemistry, California Polytechnic State University, 2011.
Nabifarkhani et al., "Effect of nano-composite and Thyme oil (*Tymus vulgaris* L) coating on fruit quality of sweet cherry (*Takdaneh cv*) during storage period," *Food Science & Nutrition*, May 10, 2015 (6 pages, doi:10.1002/fsn3.226).
Pilon et al., "Chitosan nanoparticle coatings reduce antimicrobial growth on fresh-cut apples while not affecting quality attributes," *Int. J. Food Science and Tech.*, 2015, 50, 440-448, Jul. 15, 2014.
Rao et al., "Composite coating of alginate-olive oil enriched with antioxidants enhances postharvest quality and shelf life of Ber fruit (*Ziziphus mauritiana lamk.* Var. *gola*)," *Journal of Food Science and Technology*, 53(1): 748-756, Jan. 2016.
Ruiz-Ramos et al., "Interrelationship between the viscoelastic properties and effective moisture diffusivity of emulsions with the water vapor permeability of edible films stabilized by mesquite gum-chitosan complexes," *Carbohydrate Polymer*, 64(2): 355-363, May 11, 2006.
Sagitani et al., "Making homogeneous and fine droplet O/W emulsions using nonionic surfactants," *JAOCS*, pp. 738-743, Jun. 1981.
Schrader et al., "Stress-Induced Disorders: Effects on Apple Fruit Quality," *WSU-TFREC Postharvest Information Network*, Dec. 2003 (7 pages).
Soradech et al., "Utilization of shellac and gelatin composite film for coating to extend the shelf life of banana," *Food Control*, vol. 73, Part B, pp. 1310-1317, Mar. 2017.
Togrul et al., "Extending shelf-life of peach and pear by using CMC from sugar beet pulp cellulose as a hydrophilic polymer in emulsions," *Food Hydrocolloids*, 18:215-226, May 29, 2003.
Tzoumaki et al., "Impact of edible coatings and packaging quality of white asparagus (*Asparagus officinalis*, L.) during cold storage," *Food Chemistry*, 117(1): 55-63, Nov. 1, 2009.
Vina et al., "Effects of polyvinylchloride films and edible starch coatings on quality aspects of refrigerated Brussels sprouts," *Food Chemistry*, 103(3): 701-709, Oct. 30, 2006.
Wang et al., "Assessment of film-forming potential and properties of protein and polysaccharide-based biopolymer films," *International Journal of Food Science and Technology*, 42(9): 1128-1138, Jun. 26, 2007.
Yaman et al., "Effects of an edible coating and cold storage on shelf-life and quality of cherries, LWT," *Food Science and Technology*, 35(2): 146-150, Mar. 2002.
Jung et al., "Development and preliminary field validation of water-resistant cellulose nanofiber based coatings with high surface adhesion and elasticity for reducing cherry rain-cracking," *Scientia Horticulturae*, vol. 200, pp. 161-169, Jan. 23, 2016.
Office Action issued by Japanese Patent Office on Oct. 12, 2021 for Japanese Application No. 2019-540626.
Office Action issued by Russian Patent and Trademark Office on Nov. 10, 2021 for Russian Application No. 2019123364.
Korean Intellectual Property Office, Notice of Office Action for related Korean Patent Application No. 10-2019-7024198, dated Oct. 4, 2022, and English translation.
Kim et al., "Dispersion of cellulose crystallites by nonionic surfactants in a hydrophobic polymer matrix," *Polymer Engineering and Science*, 49(10): 2054-2061, Jul. 17, 2009.
Office Action issued for Japanese Application No. 2019-540626 on May 10, 2022.
Substantive Examination Adverse Report issued for Malaysian Application No. PI2019004208 on Mar. 31, 2022.
Vigneshwaran et al., "Effect of gum arabic on distribution behavior of nanocellulose fillers in starch film," *Appl. Nanosci.*, vol. 1, pp. 137-142, Aug. 24, 2011.
Vu et al., "Development of edible bioactive coating based on modified chitosan for increasing the shelf life of strawberries," *Food Research International*, 44(1): 198-203, Oct. 29, 2010.
Written Opinion issued for Singapore Application No. 11201906826T on Jul. 6, 2022.
Pre-Trial Examination Report dated Jul. 18, 2023 from corresponding JP Application No. 2019-540626 (2 pages).
Debeaufort, et al., "Effect of surfactants and drying rate on barrier properties of emulsified edible films," *International Journal of Food Science and Technology*, Apr. 30, 1995, 183-190.
English translation of Office Action issued for CO Application No. NC2019/0009002 on Feb. 21, 2023.
English translation of Office Action issued for HN Application No. 2005/2019 on Apr. 2, 2023.
English translation of Office Action issued for KR Application No. 10-2019-7024198 on May 25, 2023.
Matsardiou et al. "The Influence of Surfactant HLB and Oil/Surfactant Ratio on the Formation and Properties of Self-emulsifying Pellets and Microemulsion Reconstitution," *AAPS PharmSciTech.*, Dec. 13, 2012, 1319-1330.
Walker et al., "Physical and oxidative stability of fish oil nanoemulsions produced by spontaneous emulsification: Effect of surfactant concentration and particle size," *Journal of Food Engineering*, 164, Apr. 29, 2015, 10-20.

\* cited by examiner

| | Day 0 | Appearance and selected quality parameters after certain days of ambient storage | |
|---|---|---|---|
| Control | | | After 7 days WL=8.0±1.2[a], Firmness=3.2±1.4[a] |
| Coated | | | WL=6.6±1.0[a], Firmness=2.7±1.0[a] |
| Control | | | After 7 days WL=11.2±1.3[a], Firmness=7.4±1.2[a] |
| Coated | | | WL=7.3±0.7[b], Firmness=11.9±3.0[a] |
| Control | | | After 14 days WL=27.1±6.9[a], Firmness=6.2±1.8[b] |
| Coated | | | WL=14.5±2.5[b], Firmness=24.1±2.7[a] |
| Control | | | After 14 days WL=4.3±1.2[a], Firmness=16.2±9.3[a] |
| Coated | | | WL=2.9±1.3[a], Firmness=9.2±3.6[a] |

FIG. 6

FOOD PRODUCT COATINGS

CROSS REFERENCE TO RELATED APPLICATION

This application is a continuation of International Application No. PCT/US2018/016021, filed on Jan. 30, 2018, which claims the benefit of the earlier filing date of U.S. Provisional Patent Application No. 62/452,897, filed on Jan. 31, 2017; each of these prior applications is incorporated herein by reference in its entirety.

FIELD

Disclosed herein are embodiments of coating compositions and films for foodstuffs and methods of making and using the same.

BACKGROUND

Cavendish banana (Musa acuminate) is a rich source of vitamins and bioactive compounds (e.g. dietary fiber and phenolic compounds), and one of mostly consumed fruit worldwide. As a climacteric fruit, however, bananas have a relatively short shelf-life, regarding physiological disorder, postharvest diseases, and senescence. Bananas are just one example of foods that typically require an external modification to preserve shelf-life of the food. There remains a need in the art for improved compositions and coatings that can improve self-life and/or pre-harvest integrity of various food items, such as perishable foods, plants and plant parts.

SUMMARY

Disclosed herein are embodiments of a coating composition, comprising a cellulose nanomaterial and an emulsion system, comprising a hydrophobic agent (e.g., a fatty acid) and a surfactant. The coating compositions can further comprise a functional agent, a plasticizer, or any combination thereof. In some embodiments, the cellulose nanomaterial can comprise cellulose nanocrystals or cellulose nanofibrils.

Also disclosed herein are embodiments of a dried (or substantially dried) coating comprising a cellulose nanomaterial and an emulsion system, comprising a hydrophobic agent and a surfactant and substantially free of moisture. In some embodiments, the coating composition or the dried (or substantially) dried coating can be used to coat a foodstuff, such as a plant or plant part.

Also disclosed herein are embodiments of a method, comprising coating or substantially coating a plant or plant part with a coating composition embodiment described herein.

The foregoing and other objects, features, and advantages of the present disclosure will become more apparent from the following detailed description, which proceeds with reference to the accompanying figures.

BRIEF DESCRIPTION OF THE DRAWINGS

FIG. 6 shows photographic images comparing the appearance, weight loss, and firmness of different fruits that do not comprise a coating ("Control") and that comprise a coating ("Coated") formed from a composition comprising 0.3% w/w (wet basis) CNF, 1% w/w (wet basis) sucrose ester of fatty acid and 1% w/w (wet basis) oleic acid.

DETAILED DESCRIPTION

Overview of Terms

Figure 1:
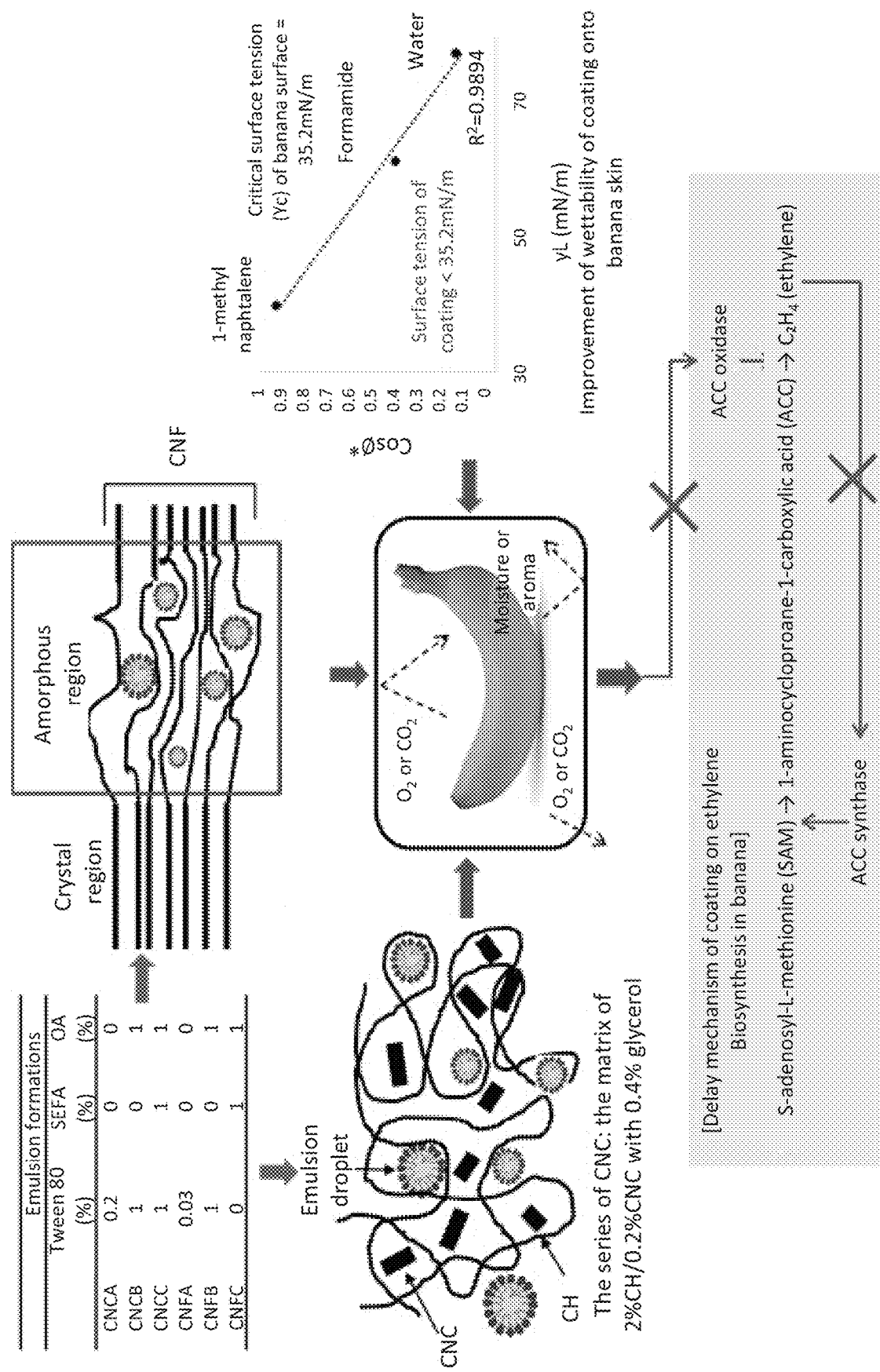
FIG. 1 is a schematic diagram showing development mechanisms of different coating composition embodiments described herein and their effects on delaying ethylene biosynthesis of postharvest bananas.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The term "cellulose nanocrystal" as used herein refers to a cellulosic object composed of at least one elementary fibril, containing predominately crystalline and paracrystalline regions, which does not exhibit branches or entanglement between cellulose nanocrystals or network-like structures.

The term "cellulose nanofibril" as used herein refers to a cellulosic object composed of at least one elementary fibril, containing crystalline, paracrystalline, and amorphous regions, which may exhibit longitudinal splits, entanglement between cellulose nanofibrils, or network-like structure.

The term "crosslinking" as used herein refers to the use of a substance (molecular or ionic) to link at least two molecules (whether the same or different) through a chemical bond, such as a covalent, ionic, and/or electrostatic bond.

The term "elementary fibril" or "fibril" as used herein refers to a cellulosic structure, originating from a single terminal enzyme complex, having a configuration of cellulose chains specific to each plant, animal, algal and bacterial species.

The term "encapsulation" as used herein refers to the formation of a complete or partial barrier around a particle or an object for specifically controlling the movement of substances into or out of encapsulated particle or object.

The term "exogenous" refers to any material that is present in or on an organism or living cell or system or object, but that originated outside of that organism/cell/system/object, as opposed to something that is endogenous. As used herein, exogenous distinguishes the synthetic films disclosed herein from natural films or cuticles produced by plants or plant parts.

The term "leaching" as used herein refers to the extraction of certain organic and inorganic materials from a plant or plant part into a liquid, such as a processing composition or other suitable aqueous or non-aqueous composition.

The term "mitigate(ing)" as used herein refers to the ability of the disclosed composition, or a dried (or substantially dried) coating or film made from the composition, or a method using the composition to substantially reduce (e.g., such as by 10%, 20%, 30%, 40%, 50%, 60%, 70%, 80%, or 90%) pre- or post-harvest damage from occurring. In some embodiments, pre- or post-harvest damage can be caused by biotic stress, abiotic stress, storage, and/or processing (e.g., thermal processing).

The term "nanofiber" as used herein refers to a nano-object with two external dimensions in the nanoscale and the third dimension significantly larger.

The term "nutrients" as used herein refers to any component that is found in a plant or plant part, whether occurring naturally or having been absorbed during growth. Nutrients can include, but are not limited to primary macronutrients, such as nitrogen, phosphorus, potassium; secondary macronutrients, such as calcium, sulfur, and magnesium; micronutrients or trace minerals, such as boron, manganese, iron, zinc, copper, nickel, and the like.

The term "plant" as used herein refers to a whole plant including any root structures, vascular tissues, vegetative tissues and reproductive tissues. A "plant part" includes any portion of the plant. For example, plant parts may be obtained upon harvesting a plant. Plant parts encompassed by the present disclosure include, but are not limited to, flowers, fruits, seeds, leaves, vegetables, stems, roots, branches, and combinations thereof, which are less than the whole plant from which they are derived.

The term "prevent(ing)" as used herein refers to the ability of the disclosed composition, or a dried (or substantially dried) coating or film made from the composition, or a method using the composition to completely or substantially stop pre- or post-harvest damage from occurring. In some embodiments, pre- or post-harvest damage can be caused by biotic stress, abiotic stress, storage, and/or processing (e.g., thermal processing).

The term "UV damage" as used herein refers to any sort of damage to the objects described herein that is caused by ultraviolet light. In some embodiments, such damage can include wilting, discoloration, shrinking, spotting, and the like.

The term "stabilizing agent" refers to a compound that can improve the material properties, particularly water resistance and mechanical properties of the a dried (or substantially dried) coating or film made from the coating composition, and also the affinity between the cellulose nanomaterial and the inorganic salt component.

The amounts of the compositional components that can be used in the coating compositions are expressed as weight/weight percent based on wet basis unless otherwise indicated. In instances where compositional components are in the form of, or combined as, an aqueous solution, the amounts of components can be expressed as weight/volume percent (w/v %) or weight/weight percent (w/w %) as these units are essentially identical.

Abbreviations

CH Chitosan
OA Oleic acid
SEFA sucrose ester of fatty acid
ACC 1-aminocyclopropane-1-carboxylic acid
CNC cellulose nanocrystal
CNF cellulose nanofiber
ACS ACC synthase
CNFC Chitosan-containing nanofiber
CN Cellulose nanomaterial
CNCC Chitosan-containing nano calcium carbonate
NCC Nano calcium carbonate
SEM Scanning electron microscopy

INTRODUCTION

Several postharvest technologies, such as low temperature, edible coatings, and hypobaric and controlled atmosphere storages, have been applied to delay the ripening and quality deterioration of fruit during postharvest storage. However, low temperature storage might cause chill injury and physiological damage on banana fruit, and hypobaric and controlled atmosphere storages are capital intensive and expensive. Edible coatings have been widely applied as a cost efficient, environmentally-friendly postharvest technology for fruit and vegetables. Such coatings can generate a modified atmosphere by creating a semipermeable barrier against oxygen, carbon dioxide, moisture, and solute movement.

Although lipid and/or hydrocolloid-based coatings have been utilized for extending the shelf-life of various fruits, such as postharvest bananas, there exist a number of challenges, such as insufficient moisture and gas barrier and poor adhesion onto fruit surfaces that must be addressed in the art. The present disclosure describes unique coating compositions, coatings, and films that help food items (e.g., packaged foods, plants, and plant parts) retain various properties (e.g., firmness, reduced weight loss, etc.) and thus improve and maintain the overall integrity and marketability of the food item. The disclosed compositions, coatings, and films, include a unique combination of cellulose nanomaterial and emulsion systems that help sustain this integrity and marketability.

Composition and Coating Embodiments

Disclosed herein are embodiments of a composition that can be used to form coatings on the exterior surface of a food item, such as a packaged, perishable food product, a plant, or a plant part.

In some embodiments, components of the coating compositions described herein are edible and in some examples they have a regulatory status of generally recognized as safe (GRAS) as provided by the United States Food and Drug Administration. In other examples the components are listed on the Environment Protection Agency's 4A and 4B lists as being safe for the environment.

The coating composition embodiments described herein comprise a cellulose nanomaterial. Cellulose nanomaterial, as used herein, is a cellulosic material consisting primarily of linear chains of one hundred to over ten thousand β-D- glucopyranose units linked by glucosidic bonds at their C1 and C4 positions, with nanoscale external dimensions, or in some embodiments, having a nanoscale internal structure or surface structure. In some embodiments, cellulose nanomaterials can comprise cellulose nanofibrils (which are also referred to herein as "CNF") or cellulose nanocrystals (which are also referred to herein as "CNC"). In some independent embodiments, such nanomaterials may contain a portion of cellulose microcrystals or cellulose microfibrils. The amount of cellulose microcrystals and/or cellulose microfibrils present in such embodiments can be reduced or increased depending on the extraction method use to make the cellulose nanomaterial and/or by varying the cellulose-containing species from which these components are extracted. In some embodiments, the cellulose nanomaterials consist of cellulose nanofibrils or cellulose nanocrystals. The cellulose nanomaterial typically is selected to provide a clear coating and an improved matrix for incorporation of other materials/components disclosed herein.

The cellulose nanomaterial of the disclosed coating composition typically is selected to have a suitable structure and suitable chemical properties for use in the particular composition embodiments and methods of using the compositions disclosed herein. For example, the cellulose nanomaterial typically is selected to provide an acceptably clear, water-resistant coating. In some embodiments, the cellulose nanomaterial structure and compound properties are optimized to provide a type of cellulose nanomaterial that comprises both crystalline regions and amorphous regions. In some embodiments, the cellulose nanomaterial can have dimensions of from 3 nm to 300 nm in width. In some embodiments, the cellulose nanomaterial can have a length ranging from 15 nm to 100,000 nm, such as 50 nm to 100,000 nm, or 100 nm to 10,000 nm, 100 nm to 5,000 nm, 100 nm to 2,500 nm, 100 nm to 2,000 nm, or 100 nm to 1,000 nm. In some embodiments, the disclosed cellulose nanomaterial disclosed herein can have an aspect ratio reminiscent of elementary fibrils in plant cell walls. In some embodiments, the cellulose nanomaterial has an aspect ratio (ratio of the longest dimension to the shortest dimension) ranging from 5 to 1000, such 10 to 1000, or 20 to 1000, or 30 to 1000, or 50 to 1000. An exemplary cellulose nanomaterial having aspect ratios within this range is the cellulose nanofibril material disclosed herein. In other embodiments, the cellulose nanomaterial can have an aspect ratio ranging from 5 to 1000, such as 5 to 500, or 5 to 250, or 5 to 200, or 5 to 150, or 5 to 100. An exemplary cellulose nanomaterial having an aspect ratio within this range is the cellulose nanocrystal material disclosed herein. In particular disclosed embodiments, the cellulose nanomaterial may be cellulose nanofibrils that can be prepared using typical methods known to a person of ordinary skill in the art with the benefit of this disclosure, such as fibrillation with or without chemical pretreatment in the mechanical refining of cellulose derived from wood fiber or non-wood plant fiber. The method used to prepare the cellulose nanofibrils may or may not provide a composition of cellulose nanofibrils containing residual hemicelluloses. In some embodiments, the cellulose nanofibrils may be purchased from a commercial source and then used in the disclosed compositions.

The coating composition embodiments disclosed herein can further comprise an emulsion system, a functional additive, a plasticizer, or any combinations thereof and typically are aqueous compositions. In some embodiments, the emulsion system can comprise one or more hydrophobic agents (e.g., fatty acid), one or more surfactants, or any combinations thereof. Emulsion system embodiments, functional additives, and plasticizers are described in more detail below. In particular disclosed embodiments, the coating composition comprises, consists essentially of, or consists of a cellulose nanomaterial, a functional additive (e.g., chitosan, aloe vera, potassium sorbate, ethylenediaminetetraacetic acid (EDTA), a quaternary ammonium salt, or any combination thereof), a plasticizer (e.g., glycerol, sorbitol, polyethylene glycol 400, or any combination thereof), and an emulsion system. In a representative embodiment, the coating composition comprises, consists essentially of, or consists of cellulose nanocrystals, chitosan, glycerol, and the emulsion system. In yet additional embodiments, the coating composition comprises, consists essentially of, or consists of a cellulose nanomaterial and an emulsion system. In representative embodiments, the coating composition comprises, consists essentially of, or consists of cellulose nanofibrils and the emulsion system. In "consisting essentially of" embodiments, the coating composition may comprise other components than those specified in such embodiments; however, these additional components do not deleterious affect the properties of the coating (as determined by comparing a food product comprising a coating made from such a composition with a food product without the coating), such as by decreasing wettability of the coating onto the food product, increasing color degradation, increasing weight loss, decreasing marketability, increasing ethylene production, increasing $CO_2$ concentration while decreasing $O_2$ concentration, or any combination thereof. Particular amounts of components of the coating compositions are described below; these amounts are expressed as a percentage of the total composition and, unless indicated otherwise, the percentages described below refer to w/w as determined on a wet basis.

The emulsion system embodiments disclosed herein can comprise, consist essentially of, or consist of one or hydrophobic agents, one or more surfactants, or any combinations thereof. In particular disclosed embodiments, the emulsion comprises, consists essentially of, or consists of one surfactant and a hydrophobic agent. In embodiments where the emulsion system "consists essentially of" the one or more hydrophobic components, one or more surfactants, or any combinations thereof, the emulsion system does not comprise, or is free of, any components that would deleteriously effect the emulsion system (e.g., disrupt the ability of the emulsion system to form emulsion droplets and/or other types of agglomerations). For example, emulsion systems that "consist essentially of" the one or more hydrophobic components, one or more surfactants, or any combinations thereof are free of components that would result in creaming, sedimentation, flocculation, coalescence, or separation of the emulsion system. In embodiments where the emulsion system comprises a fatty acid and a surfactant, the surfactant typically is selected based on its ability to form hydrophobic droplets (or other type of agglomerated structure) and promote placement of the emulsion system into the hydrophilic cellulose nanomaterial matrix and/or to decrease the surface tension of the coating composition for improving stability, uniformity, and spreadability of emulsion coatings.

In some embodiments, the one or more hydrophobic components of the emulsion system can be an oil or a fatty acid. The oil can be an essential oil, such as, but not limited to, thyme oil, clove oil, oregano oil, lemongrass oil, marjoram oil, cinnamon oil, coriander oil, or any combinations thereof; vegetable oil; olive oil; avocado oil; coconut oil; and any combinations thereof. In particular disclosed embodiments, the fatty acid is a medium-chain fatty acid, with an aliphatic tail comprising 6 to 12 carbons (saturated or unsaturated), such as capric acid and lauric acid; a long-chain fatty acid, with an aliphatic tail comprising of 13 to 21 carbons (saturated or unsaturated), such as oleic acid, linoleic acid, α-Linolenic acid, palmitic acid, stearic acid, arachidic acid; or any combination thereof. In some embodiments, the one or more surfactants of the emulsion system can be selected from a polysorbate surfactant (e.g., polyoxyethylene (20) sorbitan monolaurate, also referred to as "TWEEN 20"; or polyoxyethylene (80) sorbitan monolaurate, also referred to as "Tween 80"), a sorbitan surfactant (e.g., sorbitan monolaurate, also referred to as "SPAN 20"; or sorbitan monooleate, also referred to as "SPAN 80"), a sucrose ester of a fatty acid (e.g., a sucrose ester of a fatty acid having one to eight carbons in the hydrocarbon chain of the fatty acid, such as a sucrose ester of propionic acid, butyric acid, valeric acid, caprylic acid, or unsaturated versions thereof), or any combinations thereof. In particular disclosed embodiments, the surfactant is Tween 80, SEFA, or a combination thereof. In representative embodiments, the emulsion system comprises, consists essentially of, or consists of TWEEN 80. In yet additional embodiments, the emulsion system comprises, consists essentially of, or consists of TWEEN 80 and oleic acid. In yet additional embodiments, the emulsion system comprises, consists essentially of, or consists of SEFA and oleic acid.

In yet some additional embodiments, the coating composition can further comprise one or more additional components, such as a stabilizer (e.g., carboxy- or sulfate-containing polysaccharides selected from, but not limited to, alginic acid, sodium alginate, cellulose, cellulose derivatives, pectic polysaccharides, carboxymethyl dextran, xanthan gum, carboxymethyl starch, hyaluronic acid, dextran sulfate, pentosan polysulfate, carrageenans, fuciodans, or any combinations thereof), an inorganic salt (e.g., a sodium-containing salt, potassium-containing salt, calcium-containing salt, magnesium-containing salt, tin-containing salt, or any combinations thereof), an acidic compound (e.g., ascorbic acid or other organic acid), or any combinations thereof. In embodiments comprising any such additional components, the stabilizer can be present in an amount ranging from 0.05% w/w (wet basis) to 2% w/w (wet basis), such as 0.05% w/w (wet basis) to 0.1% w/w (wet basis), or 0.05% w/w (wet basis) to 0.75% w/w (wet basis), or 0.05% w/w (wet basis) to 0.5% w/w (wet basis), or 0.05% w/w (wet basis) to 0.25% w/w (wet basis). The inorganic salt can be present in an amount ranging from 0.05% w/w (wet basis) to 2% w/w (wet basis), such as 0.05% w/w (wet basis) to 0.1% w/w (wet basis), or 0.05% w/w (wet basis) to 0.75% w/w (wet basis), or 0.05% w/w (wet basis) to 0.5% w/w (wet basis), or 0.05% w/w (wet basis) to 0.25% w/w (wet basis). An acidic compound can be present in an amount ranging from 0.5% w/w (wet basis) to 3% w/w (wet basis), such as such as 0.5% w/w (wet basis) to 2% w/w (wet basis), or 0.5% w/w (wet basis) to 1.5% w/w (wet basis), or 0.5% w/w (wet basis) to 1.0% w/w (wet basis), or 0.05% w/w (wet basis) to 0.75% w/w (wet basis). Such components do not deleteriously affect the emulsion system or the properties of the coating composition.

Also contemplated are coating compositions further comprising one or more agricultural agents selected from nutrients (e.g., fertilizers), growth stimulants, plant growth regulators, herbicides, fungicides, pesticides, or combinations thereof. Such compositions can be made using any of the methods disclosed herein and can applied onto crops, trees, bushes, vines, vegetable plants, ornamental and decorative plants, such as plants grown for their flowers (e.g., roses, carnations, lilies, and so forth) or for their decorative foliage (e.g., ivy, ferns, and so forth), and the like. The amount of agricultural agent used in such coating composition may be selected to be within the limitations set forth in EPA guidelines. A person of ordinary skill in the art would recognize that such amounts can be determined by reviewing the EPA guidelines concerning the selected agricultural agent and selecting an amount within the lower and upper limits provided therein. In some such embodiments, the agricultural agent typically is provided in an amount ranging from 1 ppm to 5,000 ppm, such as 1 ppm to 4,000 ppm, 1 ppm to 3,000 ppm, 1 ppm to 2,000 ppm, or 1 ppm to 1,000 ppm. Amounts less than or equal to a manufacturer's suggested application level also may be used and would be readily recognized by those of ordinary skill in the art.

In some embodiments, the amount of the cellulose nanomaterial and emulsion system that is used in the coating composition is selected to provide a ratio of cellulose nanomaterial:emulsion system that ranges from 1:1 to 1:20, such as 1:2 to 1:8, or 1:1 to 1:5. In particular disclosed embodiments, the cellulose nanomaterial is cellulose nanofibrils and this material is included in the coating composition with the emulsion system at a ratio of 1:2 to 1:20 or 1:2 to 1:8. In other particular disclosed embodiments, the cellulose nanomaterial is cellulose nanocrystals and this material is included in the coating composition with the emulsion system at a ratio of 1:1 to 1:20 or 1.1 to 1:5.

In some embodiments, the amount of the cellulose nanomaterial used in the coating composition ranges from 0.1% w/w (wet basis) to 1% w/w (wet basis), such as 0.1% w/w (wet basis) to 0.75% w/w (wet basis), or 0.1% w/w (wet basis) to 0.5% w/w (wet basis), or 0.1% w/w (wet basis) to 0.4% w/w (wet basis), or 0.1% w/w (wet basis) to 0.3% w/w (wet basis), or 0.1% w/w (wet basis) to 0.2% w/w (wet basis). In particular representative embodiments, the amount of the cellulose nanomaterial used in the coating compositions is 0.1% w/w (wet basis), 0.2% w/w (wet basis), 0.3% w/w (wet basis), or 0.4% w/w (wet basis). In some embodiments, the amount of the emulsion system used in the coating composition ranges from 0.03% w/w (wet basis) to 4% w/w (wet basis), such as 0.03% w/w (wet basis) to 3.5% w/w (wet basis), or 0.03% w/w (wet basis) to 3% w/w (wet basis), or 0.03% w/w (wet basis) to 2.5% w/w (wet basis), or 0.03% w/w (wet basis) to 2% w/w (wet basis), or 0.03% w/w (wet basis) to 1.5% w/w (wet basis), or 0.03% w/w (wet basis) to 1% w/w (wet basis), or 0.03% w/w (wet basis) to 0.5% w/w (wet basis). In such embodiments, the emulsion system can comprise one surfactant in such amounts, or it can comprise a mixture of a surfactant and a hydrophobic agent in such amounts, wherein the surfactant is present in the mixture in an amount ranging from 0.03% w/w (wet basis) to 5% w/w (wet basis) (such as 0.03% w/w (wet basis) to 2% w/w (wet basis), or 0.03% w/w (wet basis) to 1% w/w (wet basis), or 0.2% w/w (wet basis) to 1% w/w (wet basis)) and the hydrophobic agent is present in the mixture in an amount ranging from 0.1% w/w (wet basis) to 5% w/w (wet basis) (such as 0.1% w/w (wet basis) to 4% w/w (wet basis), or 0.1% w/w (wet basis) to 3% w/w (wet basis), or 0.1% w/w (wet basis) to 2% w/w (wet basis), or 0.1% w/w (wet basis) to 1.5% w/w (wet basis), or 0.1% w/w (wet basis) to 1% w/w (wet basis)). In representative embodiments, the emulsion system comprises 0.03% w/w (wet basis), or 0.2% w/w (wet basis), or 1% w/w (wet basis) of a surfactant and/or 1% w/w (wet basis) of a hydrophobic agent. In embodiments further comprising a functional additive and/or a plasticizer, the functional additive can be used in amounts ranging from 0.1% w/w (wet basis) to 3% w/w (wet basis), such as 0.1% w/w (wet basis) to 2.5% w/w (wet basis), or 0.1% w/w (wet basis) to 2% w/w (wet basis), or 0.1% w/w (wet basis) to 1.5% w/w (wet basis) and the plasticizer can be present in amounts ranging from 0.02% w/w (wet basis) to 1% w/w (wet basis), such as 0.02% w/w (wet basis) to 0.5% w/w (wet basis), or 0.02% w/w (wet basis) to 0.4% w/w (wet basis), or 0.02% w/w (wet basis) to 0.3% w/w (wet basis). Additional representative coating compositions and amounts of the components used in such compositions are also described in the Examples section and the figures of the present disclosure.

In one representative embodiment, coating compositions comprising cellulose nanofibrils and an emulsion system comprising oleic acid and a sucrose ester of a fatty acid were particularly effective for enhancing postharvest storability of banana fruit during ambient storage through controlling the physiological activity and improving the adhesion of coatings onto the fruit surfaces. In some embodiments, the emulsion system enhanced the hydrophobicity, stability and wettability of coatings onto fruit surfaces. Such coating compositions also delayed the ethylene biosynthesis pathway and reduced the production of ethylene and $CO_2$ of the fruit, as well as modified the fruit surface morphology to provide more uniform coating coverage. Furthermore, such coating embodiments are effective for reducing chlorophyll degradation of banana peels and weight loss and firmness of fruit, thus enhancing the marketability and storability during ambient storage.

Also disclosed herein are coatings formed from the coating composition embodiments described herein. The term "coating" as used herein refers to a layer of the composition created on the exterior of a food product, such as a plant or plant part. The layer need not have a uniform thickness or be completely homogenous in composition. These coating compositions can be dried to form dried (or substantially dried) coatings, which are described below. Also disclosed herein are embodiments of a film that can be made using the disclosed composition embodiments. Such film embodiments can be used as flexible packaging components (e.g., biodegradable boards, films, and packages) for various perishable food products, such as meats, seafood, and the like. Embodiments of the film are edible and thus avoiding consumer concerns over food safety. In some embodiments, the film may be fibrous or crystalline and can form a durable, inert, water-resistant coating over the object being coated. In some embodiments, the film comprises a cellulose nanomaterial and a functional agent, such as chitosan.

The coating, dried (or substantially dried) coating, or film need not cover the entire object to which it is applied. In some embodiments, the coating or film can substantially coat the object. In such embodiments, the film or coating can cover 10%, 20%, 30%, 40%, 50%, 60%, 70%, 80%, or 90% of the surface area of the object. In other embodiments, the film or coating can completely coat the object—that is it can cover 100% of the object. In some embodiments, the film or coating can have a thickness that varies by 10%, 20%, 30%, 40%, 50%, 60%, 70%, 80%, or 90% over the object.

Coatings and/or films made from embodiments of the disclosed coating composition are extremely water resistant and strong. The coatings and films can provide water resistance and barrier properties while retaining the unique functionality of the non-cellulose components of the composition. The coatings and films described herein provide protection from water loss caused by transpiration and/or freeze-thaw related drip loss, and allow for improved water resistance and barrier properties while retaining the unique functionality of the non-cellulose components of the composition. In yet additional embodiments, the coatings and films exhibit enhanced adhesion between the cellulose nanomaterial and hydrophobic surfaces (e.g., hydrophobic fruit surfaces).

When applied to the target surface of plants, plant parts, or other foodstuffs, the disclosed compositions form a strong external barrier after drying. The compositions may be dried to form the dried (or substantially dried) coatings by allowing the water in the coating composition to evaporate. In some embodiments, the coatings are dried using heat to facilitate faster drying of the coating composition thereby preventing or mitigating long-term exposure to oxygen and light. Temperatures ranging from 30° C. to 35° C. can be used to dry the compositions after they have been applied to an object. In some embodiments, a hot air drying technique can be used to dry (at least partially) the coating composition after it is applied to the object. Such hot air drying techniques can use temperatures ranging from 60° C. to 90° C. for a time period ranging from 2 minutes to 10 minutes. The coatings produced using embodiments of the disclosed coating compositions can mitigate the loss of color appearance and physical integrity associated with the leaching of anthocyanins and other biological pigments (e.g., betalains), nutrients, and water-soluble compounds. In plants and foodstuffs, preventing water loss before and after harvest is important to the marketability of the products. The disclosed compositions and coatings formed from such compositions can be used to prevent such water loss in susceptible plants, and other foodstuffs.

In particular disclosed embodiments, a plant or plant part that comprises a coating made from the compositions disclosed herein exhibits properties that would not be exhibited by an equivalent plant or plant part (i.e., an identical unmodified plant or plant part) that does not comprise such a coating. For example, in some embodiments, the plant or plant part that comprises a coating formed from the disclosed composition exhibits reduced weight loss (such as a 10%, 20%, 30%, 40%, 50%, 60%, 70%, 80%, or 90% reduction) after thawing compared to an equivalent plant or plant part that is not coated with the coating. In some embodiments, the plant or plant part comprising a coating made from the composition disclosed herein exhibits reduced morphological defects (such as a 10%, 20%, 30%, 40%, 50%, 60%, 70%, 80%, 90%, or 100% reduction) compared to an equivalent plant or plant part that is not coated with the coating. In yet other embodiments, the plant or plant part comprising a coating made from the disclosed composition exhibits less loss of firmness (such as a 10%, 20%, 30%, 40%, 50%, 60%, 70%, 80%, or 90% less loss of firmness) compared to an equivalent plant or plant part that is not coated with the coating.

Method Embodiments

Disclosed herein are method embodiments for making and using the coating composition embodiments described herein.

Embodiments of the method of making the disclosed composition may comprise dispersing in water (which may be deionized, purified, and the like) a suitable amount of each composition component disclosed herein. In some embodiments, the composition components may be added to water simultaneously. In other embodiments, each component may be added sequentially to the same aqueous solution. In yet other embodiments, separate aqueous solutions of each component may be prepared and then mixed together. Certain components may not need to be dispersed in water prior to mixing and therefore may be added neat to one or more solutions containing other components. As used herein, "mixing" can be accomplished by any means known in the art. For example, mechanically stirring, agitating or co-spraying components can be used to "mix" the components described herein. In particular disclosed embodiments, the emulsion system is first prepared separately from the cellulose nanomaterial and is then combined with the cellulose nanomaterial (which can be formulated with additional components described above, such as a functional additive and/or a plasticizer). In particular disclosed embodiments, the emulsion system is made by suspending a surfactant in water at ambient temperature or under higher temperatures (e.g., 70° C.). In emulsion system embodiments further comprising a hydrophobic agent (e.g., a fatty acid), the hydrophobic agent can be added to the surfactant solution, followed by homogenization. In embodiments wherein the coating composition comprises a functional additive and/or a plasticizer, the functional additive can be pre-treated (e.g., dissolved in an acidic solution) and then combined with the plasticizer and/or the cellulose nanomaterial.

Once each component is dispersed in water (whether together or separately), the solution is then homogenized using a homogenizer at low or high shear. The level of shear used can be modified according to the type of coating composition used. The solution typically is homogenized for a time period suitable for completely dissolving, dispersing, and/or emulsifying the components in water at ambient temperature. The final composition may then be formulated for administration by soaking, spray coating, dipping, enrobing, or any other suitable technique for applying the composition to an object as disclosed herein. Representative methods for making additional coating compositions are described in the Examples section of the present disclosure.

In some embodiments, the composition is not intended for immediate use, for example when the composition is packaged for future sale. Such compositions are shelf stable, such that less than 20%, 30%, 40% or 50% of the composition will separate after 5, 10, 20, 30 or 60 days of storage. Even longer periods of storage are also contemplated. One of ordinary skill in the art will appreciate that methods of making shelf-stable compositions can involve choosing appropriate stabilizers to be added to the composition.

The compositions disclosed herein can be used to prevent pre- and post-harvest damage to plants, or parts thereof, thus extending shelf-life and increasing marketability of fresh produce. The compositions also can be used in foodstuffs to promote storage and the appearance of food items, particularly perishable items. Coatings and/or films formed from the coating compositions disclosed herein can be easily removed prior to sale, simply peeled away by the consumers, and even can be safely ingested.

In some embodiments, the coating and processing compositions disclosed herein can be used to reduce and prevent color and nutrients leaching from fruits and/or vegetables. The disclosed compositions also are useful as food coatings and in preparation of frozen foods to prevent drip loss and in maintain integrity during thawing. Foodstuffs experience significant water loss during the freezing and thawing process due to syneresis (i.e., water loss after thawing) and evaporation; films formed from compositions described herein can mitigate this water loss. For example, the disclosed compositions can be used to reduce water loss/gain in bakery goods (e.g., cookies, pastries, and breads) and/or meat during storage (cold or ambient). Some embodiments can be used to reduce water loss/gain and/or sticking of candies and other confections during storage (cold or ambient). In yet other embodiments, the disclosed compositions can be used to reduce gas (e.g., $O_2$ and $CO_2$) exchange or exposure to harmful gasses (e.g., ethylene gas) of various foods or other organic materials with air in the environment during storage and while on the shelf.

Compositions disclosed herein can also be used in an agricultural context to protect plant parts (e.g., agricultural crop seeds), plants and/or plantlets against biotic and/or abiotic stresses prior to and after harvesting. In some embodiments, the compositions described herein can be used alone or can be combined with one or more agricultural agents to inhibit biotic stresses, such as insect, nematode, and/or microbial infestation, and also to resist abiotic stresses, such as environmental stresses. One of ordinary skill in the art will appreciate that there are several methods that can be used to determine the decrease in infestation attributable to the application of the compositions described herein. For example, for microbial levels cultures can be taken and the number of colony forming units (CFUs) can be determined and compared to plant parts (e.g., agricultural crop seeds), plants and/or plantlets that were not treated with the composition. Similarly, the number of insects or insect larvae can be counted and plant parts (e.g., agricultural crop seeds), plants and/or plantlets that have been treated with the compositions described herein can be compared to similar plant parts (e.g., agricultural crop seeds), plants and/or plantlets in the same geography that have not been treated. Generally, the treated plants will display 10%, 20%, 30%, 40%, 50%, 60%, 70%, 80%, or 90% less microbial, nematode, and/or insect infestation compared to control plant parts (e.g., agricultural crop seeds), plants and/or plantlets.

In some examples, the coating compositions are used to prevent or mitigate weight loss, molding, and/or loss of firmness. Solely by way of example, embodiments of the disclosed composition can be used to prevent molding and/or morphological changes in plant parts (e.g., fruit), such as tropical fruit. Exemplary plant parts that can be coated with the coating compositions disclosed herein include, but are not limited to avocados, cantaloupe, papayas, mangos, honeydew melon, and the like.

The compositions also provide the safe, visibly transparent coatings that do not impart any significant odor or taste to the foods and that also prevents discoloration or other damage of the fruit caused by UV exposure. The films also can prevent against moisture loss caused by heat and/or sunlight.

Modifying the physical properties of biodegradable products such as boards, films and packages, for instance to provide increased resistance to degradation, improved barrier properties, and/or improved strength is yet another application for films made from compositions described herein. It is also contemplated that the films, dried (or substantially dried) coatings, and coating compositions provided herein can be used as a protective surface treatment or coating for durable materials, such as to reduce or prevent damage during transit and handling. The majority of flexible packaging materials in the food industry are petroleum-derived polymers. Their lack of sustainability and concerns over toxic residues result in decreased appeal to consumers. Alternate natural materials (e.g., cellulose and chitosan) lack water resistance. The films disclosed herein can be used to provide coatings that address these limitations.

In particular disclosed embodiments, the coating compositions can be applied to an object using any suitable method to partially or wholly coat the object and form a coating after drying. For example, the object may be dipped into the coating composition. In other embodiments, the coating composition may be dripped or brushed onto the object. In yet other embodiments, the object may be coated (partially or wholly) by spray-coating the coating composition onto the object. The object also can be enrobed (partially or wholly) using a mechanical applicator or a brush to apply the coating composition to the object. In embodiments concerning compositions that are used to coat plants and/or plant parts, such as fruits and/or vegetables, the composition can be added to the object prior to being harvested or after harvesting. Suitable sprayers and enrobers would be recognized by those of ordinary skill in the art. In some embodiments, the coating method may be chosen based on the viscosity of the coating composition. For example, if the coating composition is viscous and the object being coated is a post-harvest product (e.g., fruit or vegetable), then dipping or dripping methods of application are typically used. Pre-harvest application typically involves applying the coating to the plant or plant part thereof using a spraying method.

Myriad objects can be contacted with embodiments of the composition disclosed herein, thereby providing improved products. In some embodiments, the object is a food product, such as a plant or plant part. Exemplary objects include fruits, particularly fruits having hydrophobic surfaces, and vegetables, particularly vegetables having hydrophobic surfaces.

Generally, the objects comprising a coating produced by the composition include components as described herein, but upon drying the relative concentration of the components is altered due, for instance, to the loss of water from the composition. Therefore, a dried (or substantially dried) coating formed from the coating compositions will generally contain less water and higher concentrations/ratios of the (non-evaporative) compositional components. A substantially dried coating can still comprise a low level of moisture, such as greater than 0% to 10% moisture, or greater than 0% to 7% moisture, or greater than 0% to 5% moisture, or greater than 0% to 4% moisture, or greater than 0% to 3% moisture. Table 1 provides representative ranges for the amounts of components present in a substantially dried coating, and are expressed as % w/w on a dry basis. In a representative example, a substantially dried coating can comprise cellulose nanofibrils or cellulose nanocrystals that can be present in an amount ranging from 4.5% w/w dry basis to 9.8% w/w dry basis, such as 5.0% w/w dry basis to 8.0% w/w dry basis. In some embodiments, dry basis of each component of a substantially dried coating can be calculated with a formula: (percentage of solids in the dried coating)×(percentage of the particular component)/(sum of percentage for all components in the wet composition). In some other embodiments, dry basis for each component of a dried coating can be calculated as: $W_{dry}$=portion of component/sum total of all components. Solely by way of example, in a representative embodiment where the concentration of cellulose nanofibrils ranges from 4.5% w/w dry basis to 9.3% w/w dry basis, this range was obtained using this calculation (which accounts for 5% moisture to be retained in the substantially dried coating): 95×1.0/21, and 95×0.1/1.02, respectively. In some embodiments, the objects can comprise a dried or substantially dried coating having a thickness ranging from greater than 0 μm to 50 μm, such as 1 μm to 40 μm, or 1 μm to 30 μm.

TABLE 1

Representative dry basis concentration of components.
Concentration (%, w/w dry basis)

| Cellulose nanomaterial | Surfactants | Hydrophobic agents | Functional additives | Stabilizer | Plasticizer | Inorganic salt | Acid compound |
|---|---|---|---|---|---|---|---|
| 4.5-9.8 | 9.5-9.8 | 9.5-23 | 9.5-9.8 | 4.9-9.8 | 2-4.7 | 4.9-9.5 | 14.3-49.0 |
| 5.3-8.4 | 9.6-9.7 | 10-16.3 | 9.6-9.7 | 5.8-6.8 | 2.2-5.4 | 5.3-7.4 | 15.8-21.0 |

* Dry basis was calculated based upon moisture content of dried coating at 5%

Overview of Several Embodiments

Disclosed herein are embodiments of a coating composition, comprising: a cellulose nanomaterial in an amount ranging from 0.1% w/w wet basis to 1% w/w wet basis; and an emulsion system, comprising a fatty acid and a surfactant, wherein the fatty acid is present in an amount ranging from 0.1% w/w wet basis to 5% w/w wet basis and the surfactant is present in an amount ranging from 0.1% w/w wet basis to 2% w/w wet basis.

In some embodiments, the cellulose nanomaterial comprises cellulose nanofibrils. In some embodiments, the cellulose nanofibrils are present in an amount ranging from 0.1% w/w wet basis to 0.5% w/w wet basis.

In some embodiments, the cellulose nanomaterial comprises cellulose nanocrystals. In some embodiments, the cellulose nanocrystals are present in an amount ranging from 0.1% w/w wet basis to 1% w/w wet basis.

In any or all of the above embodiments, the fatty acid is oleic acid, capric acid, lauric acid, linoleic acid, α-Linolenic acid, palmitic acid, stearic acid, arachidic acid, and any combinations thereof.

In any or all of the above embodiments, the surfactant is a sucrose ester of a fatty acid or a polysorbate surfactant.

In any or all of the above embodiments, further comprising a functional agent, a plasticizer, or a combination thereof. In some embodiments, the functional agent is chitosan.

In any or all of the above embodiments, the plasticizer is glycerol.

In any or all of the above embodiments, the coating composition comprises a functional agent and a plasticizer, wherein the functional agent is present in an amount ranging from 0.1% w/w wet basis to 2% w/w wet basis and the plasticizer is present in an amount ranging from 0.02% w/w wet basis to 1% w/w wet basis.

In some embodiments, the coating composition comprises a cellulose nanomaterial in an amount ranging from 0.1% w/w wet basis to 1% w/w wet basis; and an emulsion system, comprising a oleic acid and a sucrose ester of a fatty acid, wherein the oleic acid is present in an amount ranging from 0.1% w/w wet basis to 5% w/w wet basis and the sucrose ester of a fatty acid is present in an amount ranging from 0.1% w/w wet basis to 2% w/w wet basis.

In some embodiments, the cellulose nanomaterial comprises cellulose nanofibrils.

In some embodiments, the coating composition comprises a cellulose nanomaterial in an amount ranging from 0.1% w/w wet basis to 1% w/w wet basis; and an emulsion system, comprising a polysorbate surfactant present in an amount ranging from 0.1% w/w wet basis to 2% w/w wet basis; and a functional agent, a plasticizer, or a combination thereof.

In some embodiments, the cellulose nanomaterial comprises cellulose nanocrystals.

In any or all of the above embodiments, the functional agent is chitosan and the plasticizer is glycerol.

Also disclosed herein are embodiments of a substantially dried coating, comprising a cellulose nanomaterial and an emulsion system, comprising a fatty acid and a surfactant.

In some embodiments, the cellulose nanomaterial is present in an amount ranging from 4.5% w/w dry basis to 9.8% w/w dry basis.

In any or all of the above embodiments, the fatty acid is present in an amount ranging from 9.5% w/w dry basis to 23% w/w dry basis.

In any or all of the above embodiments, the surfactant is present in an amount ranging from 9.5% w/w dry basis to 9.8% w/w dry basis.

In any or all of the above embodiments, the cellulose nanomaterial comprises cellulose nanofibrils.

In any or all of the above embodiments, the cellulose nanomaterial comprises cellulose nanocrystals. In some embodiments, the composition further comprises chitosan in an amount ranging from 9.5% w/w dry basis to 9.8% w/w dry basis.

In any or all of the above embodiments, the composition further comprises glycerol in an amount ranging from 2% w/w dry basis to 4.7% w/w dry basis.

Also disclosed herein are embodiments of a plant part comprising a coating formed from the coating composition according to any or all of the above coating composition embodiments.

Also disclosed herein are embodiments of a plant part comprising a substantially dried coating according to any or all of the above dried coating embodiments.

In any or all of the above embodiments, the plant part is a tropical fruit.

In any or all of the above embodiments, the plant part is a banana, a papaya, an avocado, a melon, or a mango.

Also disclosed herein are embodiments of a method, comprising coating or substantially coating a plant or a plant part with a coating composition comprising a cellulose nanomaterial in an amount ranging from 0.1% w/w wet basis to 1% w/w wet basis; and an emulsion system, comprising a fatty acid and a surfactant, wherein the fatty acid is present in an amount ranging from 0.1% w/w wet basis to 5% w/w wet basis and the surfactant is present in an amount ranging from 0.1% w/w wet basis to 2% w/w wet basis.

EXAMPLES

The following materials and methods may be useful in making and using various embodiments of the present disclosure.

Materials

CNF and CNC, derived from softwood Kraft pulp with solid content of 2.95% and 11.8%, respectively, were produced from the Process Development Center at the University of Maine (ME, USA). Chitosan (97% degree of deacetylation, 149 kDa Mw) was purchased from Premix (Iceland), Tween 80 from Amresco (OH, USA), SEFA from TCI American (OR, USA), OA and glycerol from Alfa Aesar (MA, USA), and acetic acid from J. T. Baker (NJ, USA). The 1-aminocyclopropane-1-carboxylic acid (ACC) and N-(2-hydroxyethyl) piperazine-N'-3-propanesulfonic acid (EPPS) were purchased from Chem Impex Internation, Inc. (IL, USA), HgCl2 from MP biomedicals (CA, USA), pyridoxal phosphate from TCI American (OR, USA), dithiothreitol (DTT) from Sigma (MO, USA), and trichloroacetic acid (TCA) and NaOCl from JT Baker (NJ, USA).

Organic Cavendish bananas (Piura, Peru) at the ripeness stage of 2 (green with trace of yellow) without visual defects were purchased from a local supermarket (OR, USA) at the day of their arrival at the store, and coated on the same day of purchase.

Example 1

In this example, two types of non-ionic surfactants, including Tween 80 and sucrose ester of fatty acid (SEFA) that possess different hydrophilic heads (carbohydrate for Tween 80 and ethoxylate for SEFA), were evaluated as surfactants in representative coating compositions.

In this example, the cellulose nanomaterial included cellulose nanofibers (CNF), which have high flexibility and absorption ability, and cellulose nanocrystals (CNC), which are highly-rigid, rod-like structures having a negative surface charge, which can be combined with a functional additive, such as chitosan, to provide a matrix. The ability of coating compositions comprising these components to improve the storability of postharvest bananas by improving the adhesion of coatings onto fruit surfaces, enhancing moisture barrier of coatings, controlling physiological activity, and/or modifying surface morphology of fruit was evaluated.

Fruit adhesion, hydrophobicity of coatings, and external fruit quality parameters (e.g., chlorophyll degradation, weight loss, and fruit marketability) were evaluated, as well as the effect of the coatings on the surface characteristics (e.g., critical surface tension of fruit peels and cell morphology) and physiological activity (e.g., ethylene biosynthesis pathway and ethylene and $CO_2$ production) of fruit. Additionally, the coatings were evaluated for their ability to enhance storability of fruit by monitoring the internal fruit quality (e.g., starch degradation, firmness, soluble solid contents, and titratable acidity) during ambient storage of fruit.

Coating compositions were prepared based on wet base (w/w), and the range of concentration of each component was determined based upon our preliminary studies (data not shown). Each coating matrix, including 0.3% CNF and 0.2% CNC-reinforced 2% chitosan, was formulated with surfactants (Tween 80 or SEFA) and/or OA, and derived into six different types of emulsion coatings as reported in FIG. 1 (with reference to FIG. 1, surfactant types for forming oleic acid (OA) emulsion included Tween 80 and sucrose ester of fatty acid (SEFA); θ represents the contact angle of reference liquid on banana surface; γL is the surface tension of reference liquids on banana skin; and γc is the critical surface tension of banana skin). Emulsion systems with different surfactant types were first prepared as follows: 1% Tween 80 was suspended in water at the ambient temperature, and SEFA was dispersed at 70° C. to enhance water solubility. Then, 1% OA (1%, w/w) was added to surfactant solution, and homogenized for 1 minute. A coating composition with only Tween 80 (10%, w/w dry base) was also prepared as a positive control. For CNF-based emulsion coating compositions, 0.3% CNF was mixed with surfactants and/or OA (CNFA: 0.03% Tween 80 only, CNFB: 1% Tween 80 with 1% OA, and CNFC: 1% SEFA with 1% OA), and homogenized for 1 minute (Polytron PT10-35, Luzernerstrasse, Switzerland). For CNC-reinforced chitosan emulsion coating compositions, 2% chitosan (w/w) was dissolved in 1% acetic acid solution (w/v), and homogenized with 0.2% CNC and 0.4% glycerol for 1 minute. The prepared coating compositions were mixed with surfactants and/or OA (CNCA: 0.2% Tween 80 only, CNFB: 1% Tween 80 with 1% OA, and CNFC: 1% SEFA with 1% OA), homogenized for 3 minutes, and then degassed using a self-build water flow vacuum system.

When applying coatings on the fruit surface, three different coating application methods (dipping, spraying, and dipping) were evaluated, and no significant difference on fruit storability was observed. A brushing method for further improving the spreadability of coatings over fruit surface was used. Each coating composition was manually brushed onto bananas using a paint brush (width: 25 mm) to achieve uniform coating. Fruit were dried under forced airflow for 1 hour. Non-coated and coated fruit were stored for 10 days in the ambient conditions under the florescent light without packaging (20±2° C. and 50±5% RH). Fruit coated with Semperfresh™ (Semp, 1.2%, w/w, Pace International, LLC, WA, USA) was used as a positive control. Semperfresh™ is a commercial coating product containing sucrose ester of fatty acid, mono- and di-glycerides, and carboxymethyl cellulose and has been used for coating various fruit and vegetables, including bananas.

Example 2

Coating performance is strongly influenced by the wettability of coating formulation associating to the surface characteristic of fruit. Previously, limited efforts have been made to understand the correlation of coating wettability with fruit surfaces. In this example, contact angle (CA) of coating formulation and spread coefficient ($W_s$) of coating compositions on banana surface was evaluated, as well as the surface tension (ST) of coating compositions to meet the ST of banana surfaces for ensuring sufficient adhesion of coatings on the banana surfaces.

CA was determined using a video contact angle system (FTA 32, First Ten Angstroms, Inc., USA) equipped with a face contact angle meter. 10 μL of coating composition was dropped from 10 mm height to a horizontal surface of banana surface. CA was recorded after 30 seconds for all samples excluding the influence of dispersing time on spreadability. ST of coating compositions was determined by using a FTA model T10 (First Ten Ångstroms, Portsmouth, VA) equipped with a Du Nuoy ring (CSC Scientific Co, Fairfax, VA). All data were collected within 5 minutes to reach the steady state of ST. The spreadability of coating compositions was calculated and expressed as the spreading coefficient ($W_s=W_a-W_c$) derived from adhesion coefficient ($W_a=\gamma_{SV}+\gamma_{LV}-\gamma_{SL}$, impacting the spreading) and cohesion coefficient ($W_c=2\gamma_{LV}$, impacting the contraction), where $\gamma_{SV}$, $\gamma_{SL}$, and $\gamma_{LV}$ represented solid-vapor, solid-liquid, and liquid-vapor of interfacial tensions of a coating composition.

For ensuring sufficient and uniform adhesion of coating compositions on coated fruit surface, ST of the developed coating compositions should be lower or close to the critical ST($\gamma C$) of that fruit surface. The critical ST of banana surface was obtained by extrapolation from the Zisman's plot, which was built using water, formamide and 1-methyl naphthalene as reference liquids. In some embodiments, the critical ST of fruit surfaces depends on the texture and composition of that fruit.

Example 3

In this example, the contact angle (CA) of coating composition and WVP of derived film were determined for measuring the hydrophobicity. CA of coating compositions onto the surface of silicon wafer was determined by using the same method mentioned above. Coatings were derived from developed coating compositions. Briefly, 60 mL of coating compositions were uniformly casted onto 150 mm diameter polystyrene petri dish (Falcon, PA, USA), and dried at room temperature for 2 days. Derived coatings were then conditioned at 25° C. and 50% RH in a self-assembled chamber before measurement (Versa, PA, USA) (Jung et al., 2016). WVP of the coatings were measured using a cup method based on ASTM Standard E96-87 (ASTM 2000; Park & Zhao, 2004). Each film sample (75×75 mm) was sealed with vacuum grease between the lid and the Plexiglas test cup (57×15 mm) filled up with 11 mL of distilled (DI) water, and the seal ring was closed tightly using rubber bands. Test cup assemblies were stored in the self-assembled chamber at 25° C. and 50% RH and weighed hourly for 6 hours. Data were reported as the mean value and standard deviation of three replications.

Example 4

In this example, chlorophyll content of banana peels, weight loss (%), and marketability (%) of uncoated (control) and coated fruit samples were evaluated and used as the scientific basis for selecting the coating compositions to improve the storability of fruit. Eighteen bananas were randomly assigned into three groups (6 fruit/group), with each group as one replication and three replications per treatment. Chlorophyll content of banana peels was measured using a DA meter (Sinteleia, Bolonga, Italy), and the percentage of chlorophyll degradation was reported as chlorophyll content change at different sampling times (1-10 days) from the initial chlorophyll content. The fruit weight loss (%) was calculated as weight change at different sampling times from the initial weight and multiplied by 100. The marketability (%) of fruit was determined based upon the visual observation of brown spots on banana peels, in which fruit was considered unmarketable when 20% of the fruit peels was covered with brown spots. The marketability (%) was then calculated as the number of marketable fruit at different sampling times (1-10 days) divided by total number of fruit per treatment (18 ea), and multiplied by 100.

Coating composition embodiments comprising cellulose nanofibrils, such as coating embodiments comprising CNF, oleic acid, and SEFA (e.g., a "CNFC" coating as described in certain figures) exhibited good performance based upon above measured parameters. Such coatings were further validated by coating a fresh set of fruit. Starch degradation, firmness, titratable acidity (TA), and total soluble solid (TSS) of uncoated and coated (CNFC and Semp) fruit were evaluated and photos of fruit were taken at various sampling times (0, 3, 7 and 10 days) during the same storage conditions as tested above. Pulp starch content was determined using the iodine dyeing method for estimating the conversion of starch to sugar as the result of fruit ripening. Iodine solution was freshly made using 2.5 g/L iodine and 10 g/L potassium iodide. The cross-section cut of banana was dipped into the iodine solution for 5 seconds at each sampling time, and visually observed for six cross-section cut randomly selected from six fruit for each treatment. Fruit firmness was determined as the maximum penetration force (N) using a texture analyzer (TA-XT2 Texture Analyzer, Texture Technologies Corp., NY, USA), in which individual banana was penetrated by a P/6 stainless cylinder probe with 7 mm depth at a speed of 10 mm/s. Three measurements at different locations for each individual fruit were conducted as one replication per treatment. Mean values and standard deviations were reported with six replications. For TSS and TA, 40 g of banana flesh was mixed with 160 mL of DI water using a blender (Proctor Silex, NACCO Industry Inc., VA, USA). The mixture was filtered using a qualitative filter paper with the pore size of 2.5 μm (Whatman, GE Healthcare Bio-Sciences, PA, USA). TSS of the filtrate was measured using a refractometer (RA250-HE, KEM, Tokyo, Japan). The filtrate was then titrated with 0.1 N NaOH until pH 8.3 using a pH meter (Orion 410A, Fisher scientific, MA, USA) and digital titrator (Brinkmann, TX, USA). TA was reported as the equivalent percentage of malic acid as the predominant acid in ripen banana. One measurement was conducted for each fruit as a replication per treatment, and mean values and standard deviations were reported with six replications.

Example 5

In this example, fruit physiological activity and surface characteristics of uncoated and coated fruit were investigated for understanding the mechanisms of effective coating.

The respiration ($O_2$ and $CO_2$) and ethylene production of bananas was measured using a gas chromatograph (GC-2014, Greenhouse gas analyzer, Shimadzu, Japan) with a flame ionization detector (FID, ethylene and $CO_2$) and thermal conductivity detector (TCD, $O_2$). Five bananas were randomly selected, weighted, placed inside a 1.5 L of air-tight glass jar with lid holding a 10 mm rubber septa for sampling headspace gas, and stored at the ambient temperature (20±2° C.). The $O_2$ and $CO_2$ productions were monitored after 24 hours, while ethylene production was measured after 48 hours due to the low amount of ethylene production. For each jar, 1 mL of headspace gas was collected using an air tight syringe (Series A, Valco Instrument Co., USA) and then injected into the GC fitted with three kinds of packed columns: 80/100 HAYESEP D, 8/100 HAYESEP N, and 60/80 molecular sieve column (Supelco, Bellefonte, PA, USA). Helium was applied as the carrier gas at a pressure of 350 kPa and flow rate of 21.19 mL min-1. The temperature of injector, column, and FID detector was set at 150, 90, and 250° C., respectively. The $O_2$, $CO_2$, and ethylene standard gases were purchased from Air Liquide (Scott™, PA, USA), and GC solution software (Shimadzu, Japan) was used to calculate the amount of $O_2$, $CO_2$, and ethylene.

As illustrated in FIG. 1, the coatings could impact the ethylene biosynthesis pathway of fruit by generating modified atmosphere condition. ACC was measured as the precursor of ethylene and ACS activity as an enzyme that catalyzes the synthesis of ACC from S-Adenosyl methionine (SAM).

For measuring ACC and ACS, banana flesh samples were collected at different sampling times (0, 3, 7, and 10 days), and stored at −80° C. prior to analysis. For extracting ACC, 2 g of freshly-thawed banana flesh in 10 mL of 9% TCA was homogenized for 60 seconds and incubated at 4° C. for 24 hours. The extract was centrifuged at 10,000×g for 30 minutes, and the supernatant was adjusted to pH 7-8 with 1N NaOH. Two of sample reaction mixtures were prepared with 500 μL of supernatant, 100 μL of 10 mM $HgCl_2$ (100 μL), and 300 μL of DI water in capped 10 mL vials. One of them was spiked using internal standard ACC (50 μL of 0.05 mM ACC). Both of them were incubated for 3 minutes at 4° C. after adding 100 μL of saturated NaOH and 5.25% NaOCl for hydrolysis of ACC into ethylene. Then, 5 mL gas sample was taken for ethylene measurements, and quantified by using GC. ACC concentration was expressed as pmol/g fresh sample.

For measuring ACS, 5 g of freshly-thawed banana flesh was homogenized in 10 mL of buffer with 100 mM N-(2-hydroxyethyl) piperazine-N'-3-propanesulfonic acid (EPPS), 0.5 μM pyridoxal phosphate, and 4 mM dithiothreitol (DTT) for 60 s, and adjusted to pH 8.5 with KOH. The extract was centrifuged at 10,000×g for 30 minutes, and the supernatant was dialyzed overnight at 4° C. in dialysis buffer solution (pH 8.5) containing 2 mM EPPS, 0.2 μM pyridoxal phosphate, and 0.1 mM DTT. Likewise, two of reaction mixtures containing 400 μL of enzyme solution, 50 μL of 600 mM EPPS (pH 8.5), and 90 μL DI water were prepared in capped 10 mL vials. One of them was spiked using internal standard ACC (50 μL of 0.05 mM ACC). After adding 60 μL of 0.5 mM SAM, both reaction mixtures were incubated for 3 hours at 30° C., and then mixed with 100 μL of 10 mM $HgCl_2$ and 200 μL of DI water. The reaction mixture was finally hydrolyzed by adding 100 μL of saturated NaOH and 5.25% NaOCl. A 5 mL of headspace gas was then collected after incubation at 4° C. for 3 minutes, and ethylene production was measured by using GC. ACS activity was expressed as pmol ethylene/g fresh sample.

Example 6

In this example, the effect of coatings on the surface morphology of bananas was evaluated by a scanning electron microscope (SEM) (FEI Quanta 600, Cressington Scientific Instruments Ltd., UK). Non-coated, Semp-coated, and CNFC-coated banana peels were cut into 5 mm pieces and placed in a modified Karnovsky fixative for 2 hours. Samples were rinsed in 0.1 M sodium cacodylate buffer and dehydrated in a graded series of acetone (10%, 30, 50, 70, 90, 95, 100-100%), 10-15 minutes each. Samples were dried in an EMS 850 critical point drier, mounted on the SEM stub skin side up, and coated with gold and palladium. Digital images were acquired at an accelerating voltage of 5 kV.

A completely randomized two factorial design considering two treatment factors (types of coating matrix: CNF and CNC-reinforced chitosan; types of emulsions: Tween 80 only, Tween 80 with OA, and SEFA with OA) was applied for analyzing the performance of coating compositions and derived coatings. PROC GLM was used to identify significant differences and interactions among each factor using the SAS program (SAS v 9.2, The SAS Institute, USA), and post-hoc least significant difference (LSD) was used for the multiple comparisons. All measurements were conducted in triplicates and results were considered to be significantly different at $P<0.05$.

A completely randomized design with a single treatment factor (type of coating compositions: non-coated, Semp-coated, and CNFC-coated) was then applied for further in-depth study on internal fruit quality, physiological activity and surface characteristics of bananas. All measurements were taken in either duplicates or triplicates. A one-way ANOVA was carried out to determine the significant differences among the treatments, and a post-hoc LSD was conducted using statistical software (SAS v 9.2, The SAS Institute, USA). Results were considered to be significantly different at P<0.05.

surface, hydrophobicity (contact angle) of coating compositions onto hydrophobic silica wafer, and WVP of the derived coatings.

TABLE 2

Analysis of variance (ANOVA) results and Post-hoc LSD multiple comparison tests for investigating main effects of matrix and emulsion and their interactions (matrix × emulsion) on spread coefficient, contact angle (CA) onto silicone and banana skin, surface tension of coating formulations and water vapor permeability (WVP) of the derived films

| | | | Coating formulations | | | | Derived films |
|---|---|---|---|---|---|---|---|
| Factors | | | CA (°) onto banana skin | CA (°) onto silicon wafer | Spread coefficient ($W_s$, mN/m) | Surface tension (ST, mN/m) | WVP (g ml/m² d Pa) |
| | | | Analysis of variance (ANOVA) results | | | | |
| Matrix | | | 0.8800 | 0.4213 | 0.0812 | 0.0006 | <0.0001 |
| Emulsion | | | <0.0001 | 0.0002 | <0.0001 | <0.0001 | <0.0001 |
| Matrix × emulsion | | | 0.2405 | 0.2714 | 0.0140 | 0.0006 | <0.0001 |
| Levels | | | Post-hoc LSD multiple comparison test[+] | | | | |
| Matrix | Emulsion | Interaction | Emulsion | Emulsion | Emulsion | Interaction | Interaction |
| A: CNC* | A: Tween 80 only | CNCA | 44.8 ± 4.1$^a$ | 64.9 ± 5.8$^a$ | −17.6 ± 0.4$^b$ | 33.7 ± 2.1$^b$ | 0.364 ± 0.015$^a$ |
| B: | B: Tween | CNCB | 36.8 ± 3.9 | 42.8 ± 5.0$^b$ | −8.1 ± 1.0$^a$ | 27.0 ± 1.5$^{cd}$ | 0.268 ± 0.016$^b$ |
| CNF** | 80 with OA[++] C: SEFA[+++] with OA | CNCC | 31.2 ± 3.9$^c$ | 40.1 ± 6.6$^b$ | −6.2 ± 1.6$^a$ | 26.0 ± 0.8$^d$ | 0.156 ± 0.008$^c$ |
| | | CNFA | | | −25.6 ± 4.7$^c$ | 40.6 ± 1.0$^a$ | 0.107 ± 0.016$^d$ |
| | | CNFB | | | −6.8 ± 2.0$^a$ | 28.6 ± 0.3$^c$ | 0.153 ± 0.003$^c$ |
| | | CNFC | | | −6.1 ± 2.6$^a$ | 25.4 ± 0.7$^d$ | 0.031 ± 0.001$^e$ |

*CNC was made of 2% chitosan with 0.2% cellulose nanocrystal (CNC) and 0.4% glycerol.
**CNF was made of 0.3% cellulose nanofiber (CNF).
[+]Post-hoc LSD multiple comparison test was only conducted for the factor showing the significant (P < 0.05) effect based upon ANOVA results.
[++]OA indicates oleic acid.
[+++]SEFA indicates sucrose ester of fatty acid.

Example 7

The effectiveness of fruit coatings for reducing water loss and controlling postharvest respiration rely on the sufficient wettability and adhesion of coating compositions onto the fruit surfaces and the hydrophobicity of formed coatings. In this example, wettability and hydrophobicity of coating compositions were evaluated by measuring the wettability (contact angle and spread coefficient) of coating compositions onto fruit surface and the correlation of surface tension (ST) of the coating compositions with the critical ST of fruit surface, hydrophobicity (contact angle) of coating compositions onto hydrophobic silica wafer, and WVP of the derived coatings.

The type of emulsions incorporated into coating compositions had significant (P<0.05) impact on CA on banana surfaces, showing lower CA in coating composition containing OA/Tween 80 (36.8°) or OA/SEFA (31.2°) than that with Tween 80 only (44.8°) (Table 2). The spread coefficient ($W_s$) of coating compositions was significantly (P<0.05) affected by the interactive effect between the type of coating matrix and emulsion, with the higher $W_s$ in emulsified coating compositions (CNCB, CNCC, CNFB, and CNFC) than those without emulsion (CNCA and CNFA). For ST, the two treatment factors (coating matrix and emulsion) had significant (P<0.05) interactive effect on ST of coating compositions, showing the lowest ST in CNCC and CNFC coating compositions (26.0 mM/m and 25.4 mM/m, respectively) among all treatments (Table 2). These results supported that emulsified coating compositions improved the wettability of coatings onto hydrophobic banana surfaces composing of cutin and wax in cell wall. In addition, the ST of developed coating compositions was lower than the critical ST of fruit surfaces, derived from the Zisman plot, was 35.2 mN/m (FIG. 1), indicating that banana surfaces carried low surface energy (<100 mN/m). Many fruit surfaces have low surface tension due to the presence of natural wax layer. While this nature wax layer is protective for fruit, it can lead to the need for high wettability of aqueous coatings to be uniformly adhered on fruit surfaces. To enhance wettability of coatings onto fruit surface, the ST of coating compositions should be closer and/or lower than the critical ST of the fruit surface. Above results supported that all coating compositions developed from this example, except CNFA, had lower ST than the critical ST of banana surface, thus ensuring sufficient adhesion of coatings on the banana surfaces.

In respect to the hydrophobicity, coating composition with OA/SEFA had a significantly (P<0.05) lower CA onto hydrophobic silicon wafer than that with OA/Tween 80 (Table 2), which could be attributed to the more hydrophobic SEFA in comparison with Tween 80, thus reducing the oil-water interfacial tension and improving hydrophobicity of the coatings. Meanwhile, the type of coating matrix and incorporated emulsion had significant (P<0.05) effect on WVP of derived coatings, in which WVP of CNFC film (0.03 g mL/m2 d Pa) had the lowest value among all coating compositions, indicating a superior moisture barrier (Table 2). Without being limited to a single theory, it currently is believed that the OA/SEFA emulsion system could be well dispersed into continuous CNF phase with slight surface charges and flexible structure in comparison with CNC-reinforced chitosan coating, thus preventing moisture diffusion throughout the hydrophobic CNF emulsion matrix. CNC-reinforced chitosan matrix could be less compatible with OA/SEFA emulsion system as shown by the reduced surface charges due to the electrostatic interaction between positively charged chitosan and negative surface charges of CNC and high crystallinity of continuous phase. Therefore, the emulsion system composed of OA and SEFA in CNF-based coating matrix could derive hydrophobic coatings with improved moisture barrier function.

Example 8

Figure 2A:
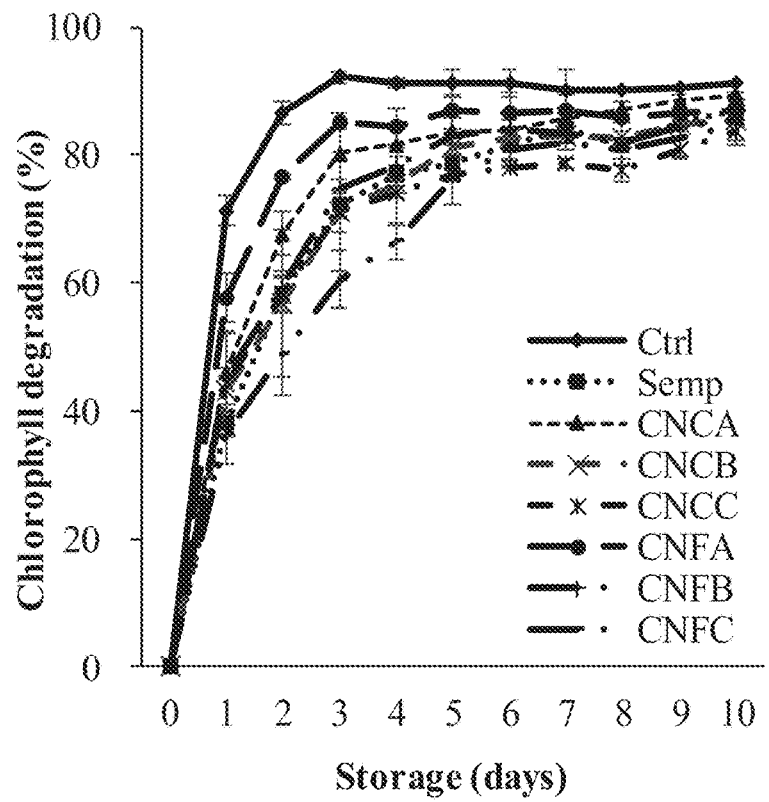
FIG. 2A is a graph showing the effect of different coating compositions on banana chlorophyll degradation during a 10-day storage period at 25±2° C. and 50±5% relative humidity, wherein "Ctrl" represents uncoated samples; "Semp" represents samples coated with a 1.2% commercial Semperfresh™ solution; and "CNC" represents coatings formed from a composition comprising cellulose nanocrystals (0.2% w/w wet basis), chitosan (2% w/w wet basis), and glycerol (0.4% w/w wet basis), and "CNF" represents coatings formed from a composition comprising cellulose nanofibrils (0.3% w/w wet basis), both with the following emulsion systems: Tween 80 only ("CNCA" and "CNFA"); Tween 80 and oleic acid ("CNCB" and "CNFB"); and sucrose ester of fatty acid and oleic acid ("CNCC" and "CNFC").
Figure 2B:
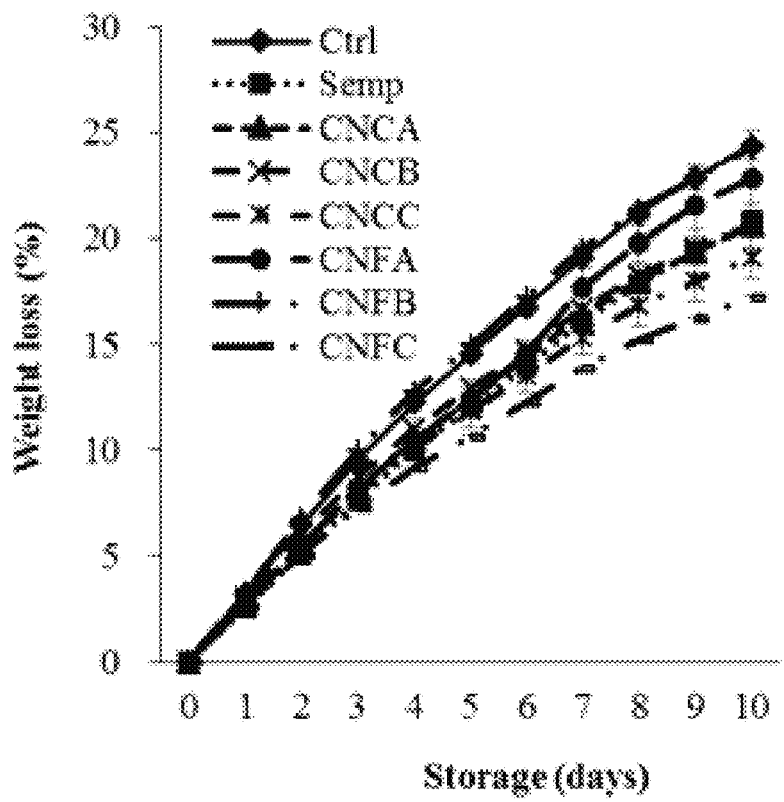
FIG. 2B is a graph showing the effect of different coating compositions on banana weight loss during a 10-day storage period at 25±2° C. and 50±5% relative humidity, wherein "Ctrl" represents uncoated samples; "Semp" represents samples coated with a 1.2% commercial Semperfresh™ solution; and "CNC" represents coatings formed from a composition comprising cellulose nanocrystals (0.2% w/w wet basis), chitosan (2% w/w wet basis), and glycerol (0.4% w/w wet basis), and "CNF" represents coatings formed from a composition comprising cellulose nanofibrils (0.3% w/w wet basis), both with the following emulsion systems: Tween 80 only ("CNCA" and "CNFA"); Tween 80 and oleic acid ("CNCB" and "CNFB"); and sucrose ester of fatty acid and oleic acid ("CNCC" and "CNFC").
Figure 2C:
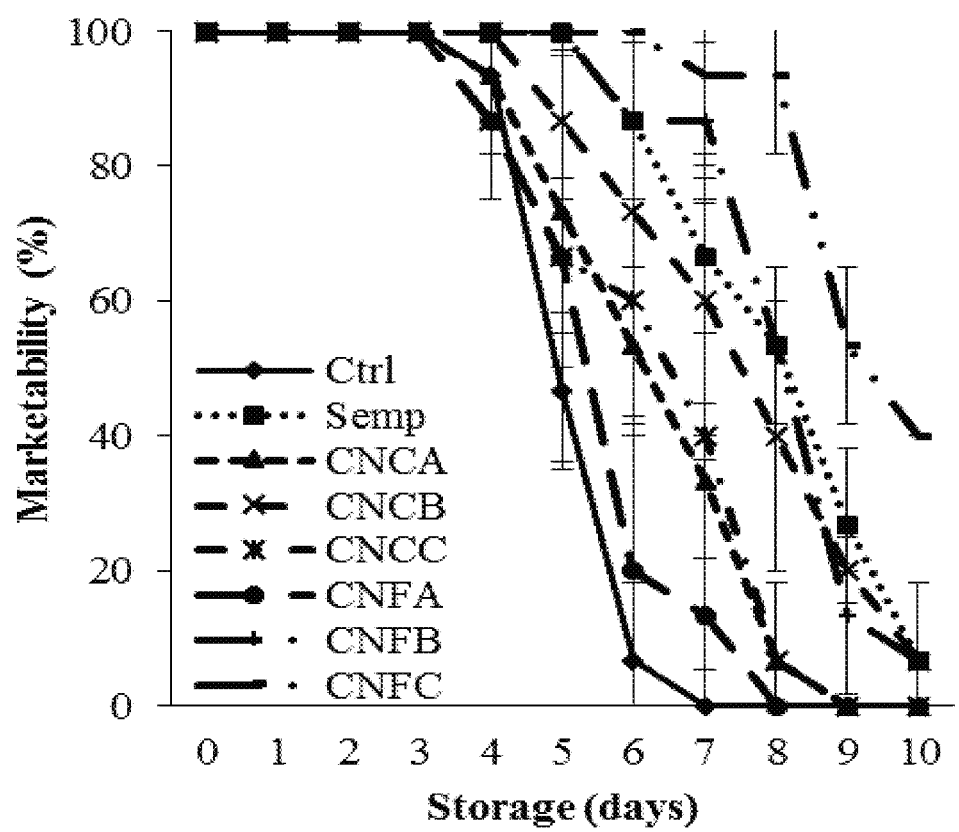
FIG. 2C is a graph showing the effect of different coating compositions on banana marketability during a 10-day storage period at 25±2° C. and 50±5% relative humidity, wherein "Ctrl" represents uncoated samples; "Semp" represents samples coated with a 1.2% commercial Semperfresh™ solution; and "CNC" represents coatings formed from a composition comprising cellulose nanocrystals (0.2% w/w wet basis), chitosan (2% w/w wet basis), and glycerol (0.4% w/w wet basis), and "CNF" represents coatings formed from a composition comprising cellulose nanofibrils (0.3% w/w wet basis), both with the following emulsion systems: Tween 80 only ("CNCA" and "CNFA"); Tween 80 and oleic acid ("CNCB" and "CNFB"); and sucrose ester of fatty acid and oleic acid ("CNCC" and "CNFC").

The effect of coating compositions on the chlorophyll degradation, weight loss, and marketability of bananas during 10 days of ambient storage is reported in FIGS. 2A-2C. The CNFC coating resulted in the least and slowest chlorophyll degradation of banana peels among all coating compositions (FIG. 2A). The CNFC coating also caused the lowest weight loss (~17%) of fruit at the end of 10 days ambient storage in comparison with uncoated (~24%) and other treatments (~19-23%) (FIG. 2B). Furthermore, CNFC retained the highest fruit marketability compared to other coating compositions over the storage period (FIG. 2C). About 50% of uncoated (control) fruit lost marketability after 5 days of storage, whereas about 90% of CNFC-coated fruit were still marketable at 8 days of storage. Without being limited to a single theory, it currently is believed that the effectiveness of the CNFC coating might be attributed the well-dispersed OA/SEFA emulsion system in the CNF coating matrix that closely interacted with fruit surfaces to provide uniform coating coverage and good moisture barrier, thus preventing moisture loss, reducing chlorophyll degradation, and improving marketability of fruit during storage.

Example 9

Figure 3A:
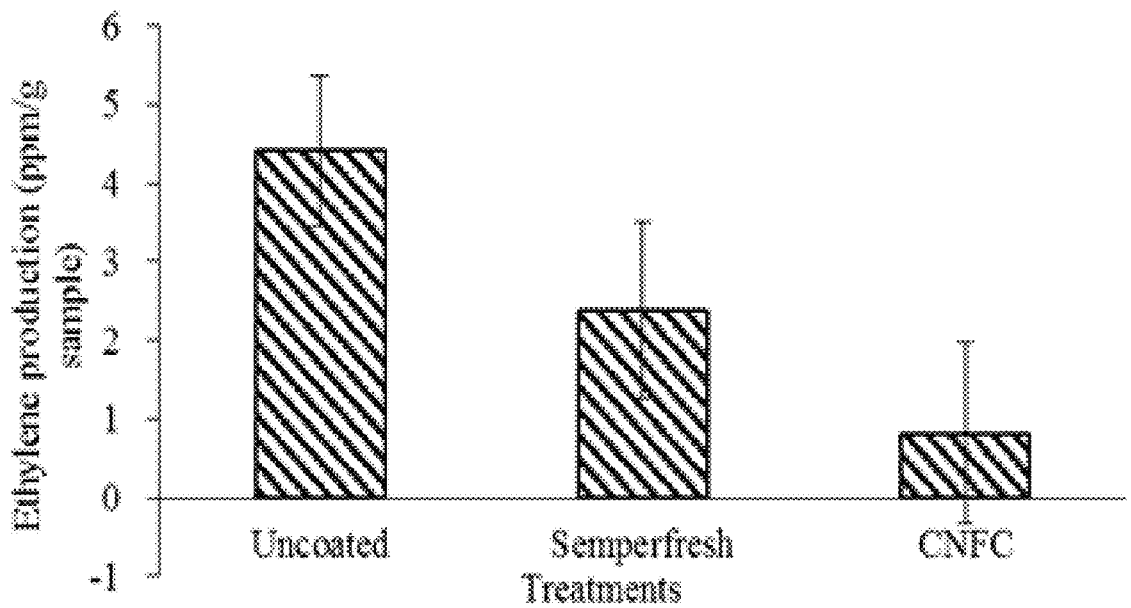
FIG. 3A is a bar graph showing a comparison of ethylene production between uncoated and coated bananas, wherein the coated samples comprised a coating made with Semperfresh™ ("Semperfresh Treatments") or an embodiment of a cellulose nanofiber coating ("CNFC") made from a composition comprising 0.3% w/w (wet basis) CNF, 1% w/w sucrose ester of a fatty acid and 1% w/w oleic acid (wet basis), wherein ethylene production was measured after 48 hours of banana storage in a 1.5 L jar.
Figure 3B:
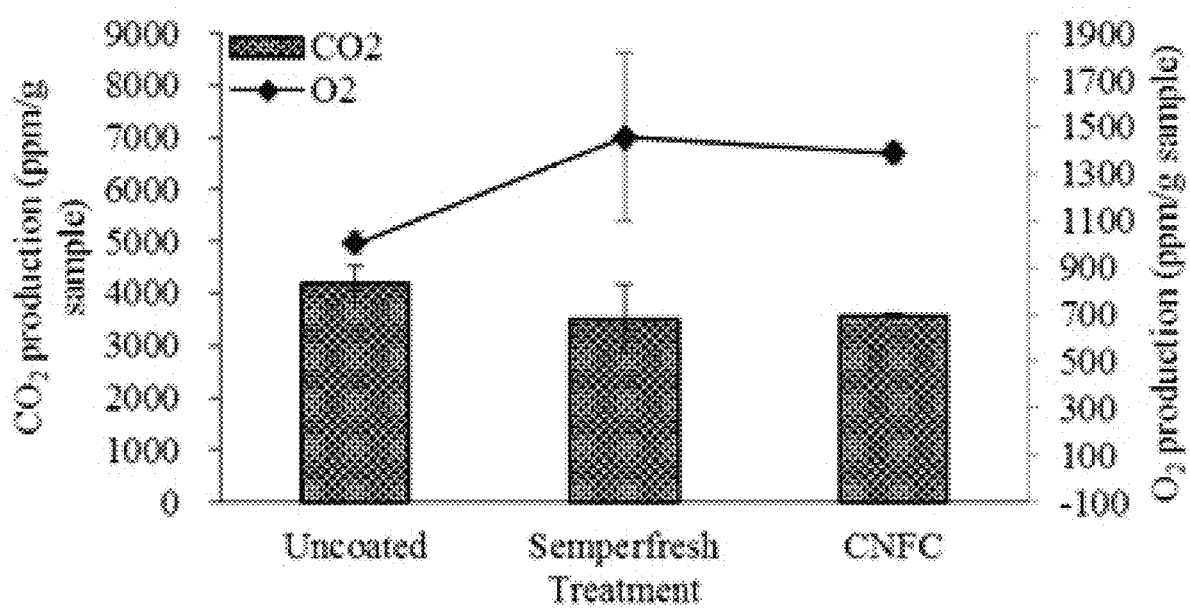
FIG. 3B is a bar graph showing a comparison of $CO_2$ and $O_2$ production between uncoated and coated bananas, wherein the coated samples comprised a coating made with Semperfresh™ ("Semperfresh Treatments") or an embodiment of a cellulose nanofiber coating ("CNFC") made from a composition comprising 0.3% w/w (wet basis) CNF, 1% w/w sucrose ester of a fatty acid and 1% w/w oleic acid (wet basis), wherein $O_2$ and $CO_2$ production values were evaluated after 24 hours of banana storage in 1.5 L jar.

In this example, uncoated, Semp-coated, and CNFC-coated fruit were further studied for their effect on the physiological activity (FIGS. 3A-3D) and surface characteristics (FIGS. 4A-4C) of bananas during ambient storage. The CNFC coating significantly reduced ethylene production of fruit (0.82 ppm/g), compared to non-coated (4.41 ppm/g) and Semp-coated fruit (2.38 ppm/g) ones (FIG. 3A). The CNFC-coated fruit also contained lower $CO_2$ and higher $O_2$ in comparison with non-coated one, while had similar $CO_2$ and $O_2$ to the Semp-coated fruit (FIG. 3B). Fruit respiration ($O_2$ and $CO_2$) and ethylene production are the main physiological indexes tracking the change of ripening and senescence over the storage period. These data supported that CNFC coating suppressed the respiration and ethylene production of bananas by forming modified internal atmosphere within fruit, thus delaying fruit ripening and senescence.

Figure 3C:
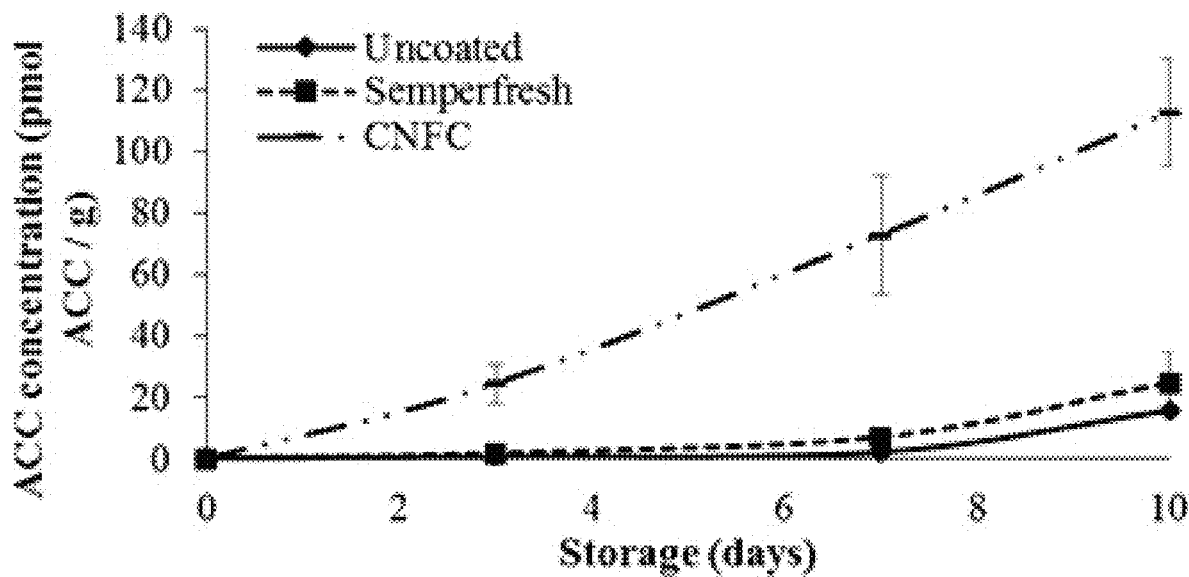
FIG. 3C is a graph showing ACC concentration as monitored during 10-day storage period at 25±2° C. and 50±5% relative humidity, wherein uncoated and coated bananas were evaluated and wherein the coated bananas comprised a coating made with Semperfresh™ ("Semperfresh Treatments") or an embodiment of a cellulose nanofiber coating ("CNFC") made from a composition comprising 0.3% w/w (wet basis) CNF, 1% w/w sucrose ester of a fatty acid and 1% w/w oleic acid (wet basis).
Figure 3D:
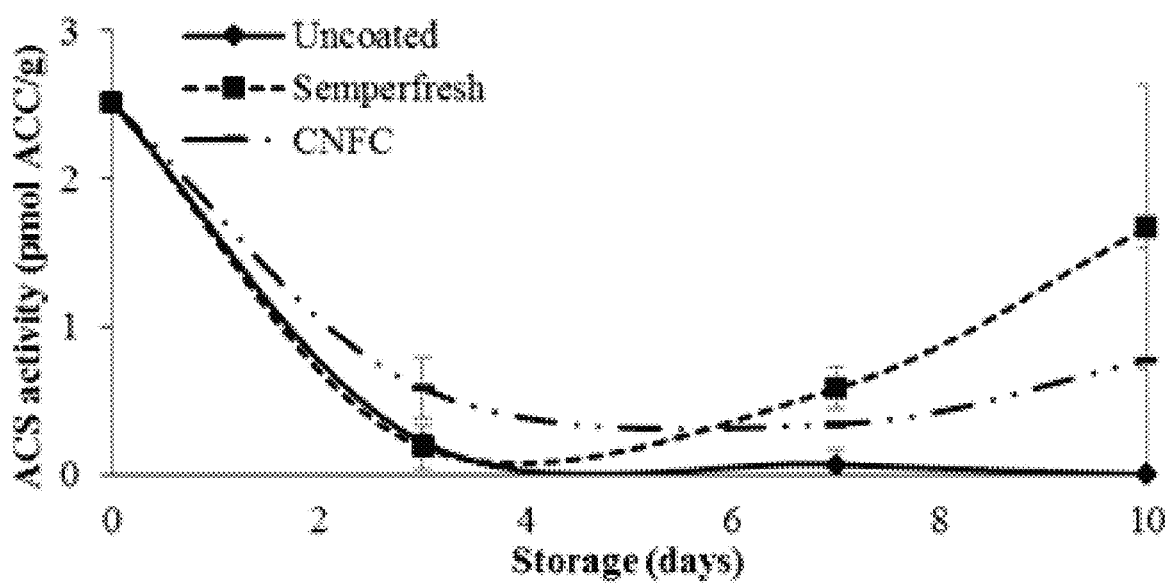
FIG. 3D is a graph showing ACS activity as monitored during 10-day storage period at 25±2° C. and 50±5% relative humidity, wherein uncoated and coated bananas were evaluated and wherein the coated bananas comprised a coating made with Semperfresh™ ("Semperfresh Treatments") or an embodiment of a cellulose nanofiber coating ("CNFC") made from a composition comprising 0.3% w/w (wet basis) CNF, 1% w/w sucrose ester and 1% w/w oleic acid (wet basis).
Figure 4A:
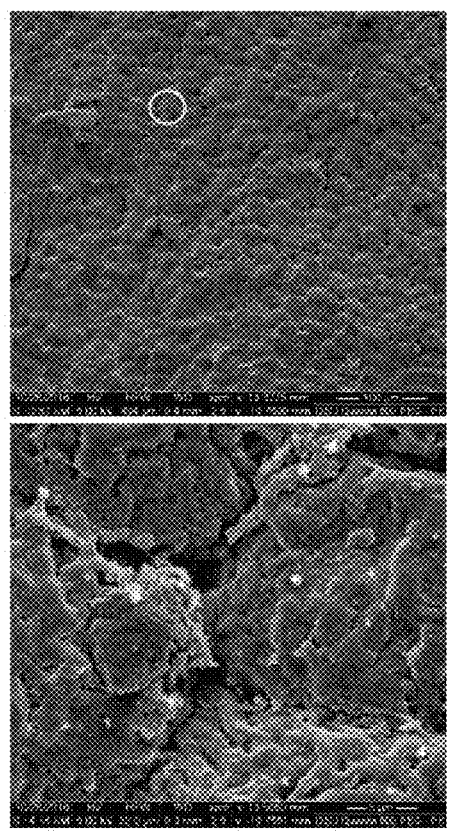
FIG. 4A includes SEM images showing the surface morphological properties of uncoated bananas at two different resolutions, 100 μm (top image) and 5 μm (bottom image).
Figure 4B:
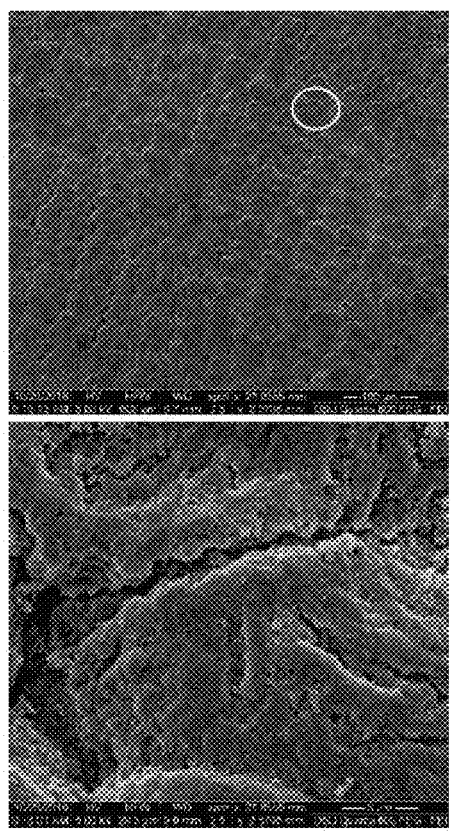
FIG. 4B includes SEM images showing the surface morphological properties of bananas coated with a 1.2% Semperfresh™ coating at two different resolutions, 100 μm (top image) and 5 μm (bottom image).
Figure 4C:
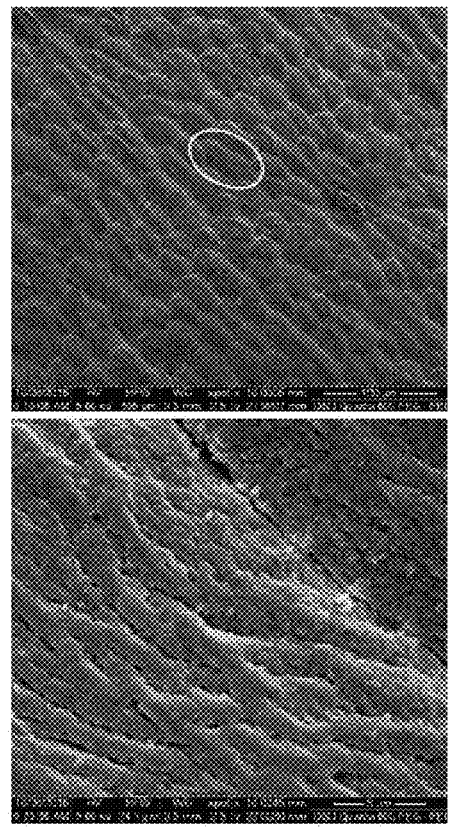
FIG. 4C includes SEM images showing the surface morphological properties of bananas coated with a coating formed from a CNFC coating composition comprising 0.3% w/w (wet basis) CNF, 1% w/w (wet basis) sucrose ester of fatty acid and 1% w/w (wet basis) oleic acid at two different resolutions, 100 μm (top image) and 5 μm (bottom image).

Postharvest climacteric fruit produces ethylene through autocatalytic ethylene biosynthesis, in which ACC as the precursor of ethylene and ACS as the catalytic enzyme synthesizing ACC from SAM (FIG. 1). As shown in FIG. 3C, CNFC coating resulted in significantly higher ACC concentration of fruit in comparison with uncoated and Semp-coated ones. This result indicated that CNFC coating modified the internal atmosphere of fruit, which limited hydrolysis of ACC into ethylene, thus generating less ethylene production with accumulated ACC in fruit. This result was consistent with the lower ethylene production in CNFC-coated fruit in comparison with uncoated and Semp-coated ones (FIG. 3B). Meanwhile, ACS activity was peaked at 0 days of storage, then gradually reduced during the first 4-5 days of storage, but increased again for CNFC and Semp-coated fruit during the rest of storage (FIG. 3D). The initial higher ACS activity could be associated with the onset of subsequent peel yellowing of obtained fruit samples. It was possible that the banana fruit obtained from the local market might already reach to the onset of subsequent peel yellowing prior to the local store. The increased ACS activity of Semp and CNFC-coated fruit after 7 days of storage might be associated with the delayed ripening in the postponed ripening stage of fruit. CNFC coating resulted in lower fruit ACS activity than that of Semp coating, showing slower ripening process. Hence, CNFC coating could control the physiological activity of bananas as shown by the lower production of ethylene and $CO_2$ and less ACS activity, thus delaying fruit ripening.

The influence of coatings on the fruit surface characteristics through SEM analysis is illustrated in FIGS. 4A-5C. The CNFC coating (FIG. 4C) uniformly covered the pericarp surface without cleavage among epidermal cells, whereas some cracks and/or cleavage between the cells were appeared for non-coated (FIG. 4A) and Semp-coated fruit (FIG. 4B). This insufficient coverage might potentially accelerate moisture loss, respiration, and fungus invasion. In addition, the size and shape of epidermal cells of CNFC-coated fruit were altered as marked in FIG. 4C, which may result from interactions between the fibrous CNF matrix and the epidermal cells of banana peels. Hence, the surface morphology of the fruit further ensured that the fibrous, hydrophobic CNFC coating could be well associated with the banana surfaces to provide effective coating performance.

Example 10

Figure 5A:
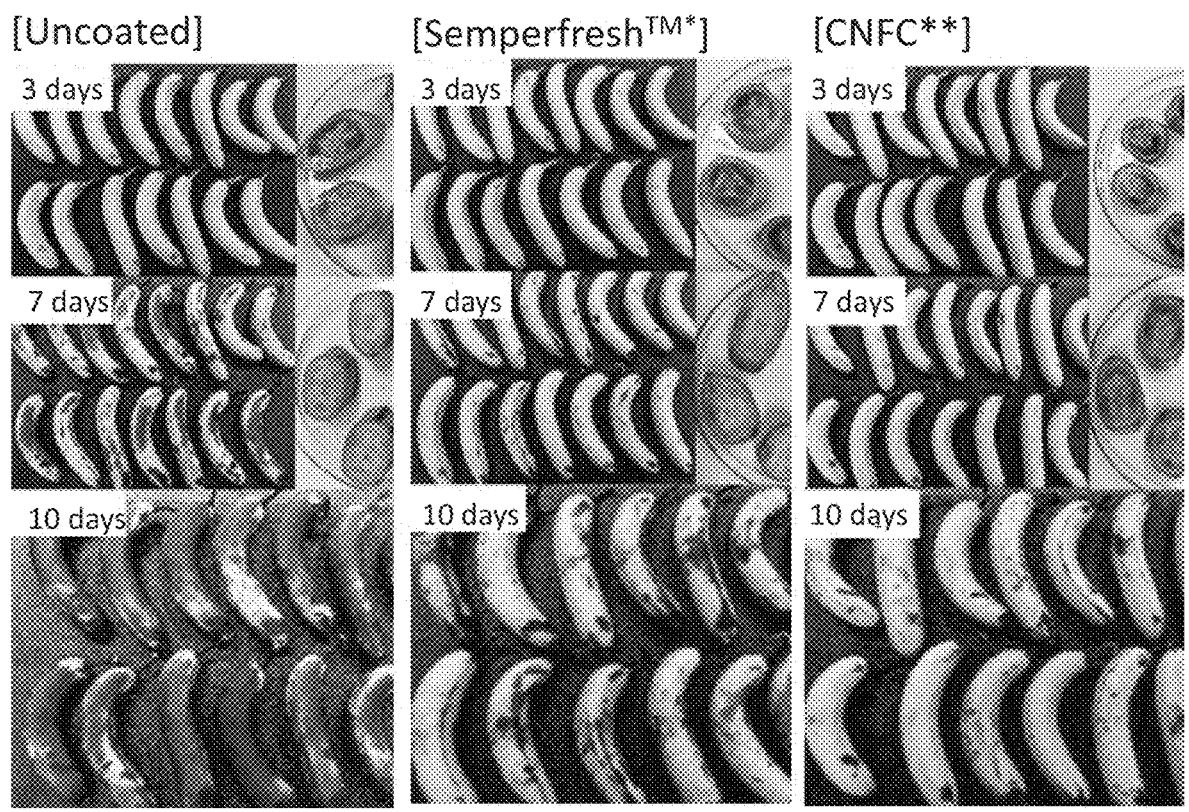
FIG. 5A provides photographic images showing comparisons between the appearance of uncoated (left image), Semperfresh™-coated (middle image), and CNFC-coated (right image) bananas for 10 days storage at 25±2° C. and 50±5% relative humidity, wherein the CNFC-coated bananas comprised a coating formed from a composition comprising 0.3% w/w (wet basis) CNF, 1% w/w (wet basis) sucrose ester of fatty acid and 1% w/w (wet basis) oleic acid.

In this example, a validation study was conducted for uncoated, Semp-coated, and CNFC-coated fruit. Visual appearance of fruit was monitored at 3, 7, and 10 d of ambient storage (FIG. 5A). During green-yellow life of banana (0-3 days of storage), both Semp (middle image of FIG. 5A) and CNFC (right image of FIG. 5A) coatings slowed down the chlorophyll degradation. During the yellow-brown life (7-10 days of storage), CNFC coating further reduced the incidence of browning spots on the fruit surfaces in comparison with uncoated and Semp-coated ones. At yellow stage, banana fruit continue to ripen, the presence of polyphenol oxidase (PPO) further promotes the changes of phenol into quinine and increase in macromolecules by polymerization, thus leading to the accumulation of brown pigment. The CNFC coating reduced the enzymatic browning in the yellow stage of fruit by delaying banana ripening and scencence.

The starch test showed the high content of starch in CNFC-coated bananas as reflected by the darker blue/black color on the cross-cut fruit surfaces from iodine reaction in comparison with uncoated and Semp-coated fruit (FIG. 5A). Similar trend was observed from TSS at 3 and 7 days of storage, showing CNFC coating resulted in the lowest TSS of fruit in comparison with non-coated and Semp-coated ones (FIG. 5A). These results proved that CNFC coating delayed banana ripening by preventing starch hydrolysis and conversion into soluble sugars. Meanwhile, TSS of CNFC-coated bananas had no significant difference from that of non-coated one at 10 days of storage, indicating that proper ripening process continued in bananas during the storage. This result was also supported by the increased ACS activity after 7 days of storage, indicating that the proper ripening continued in CNFC-coated bananas.

Figure 5B:
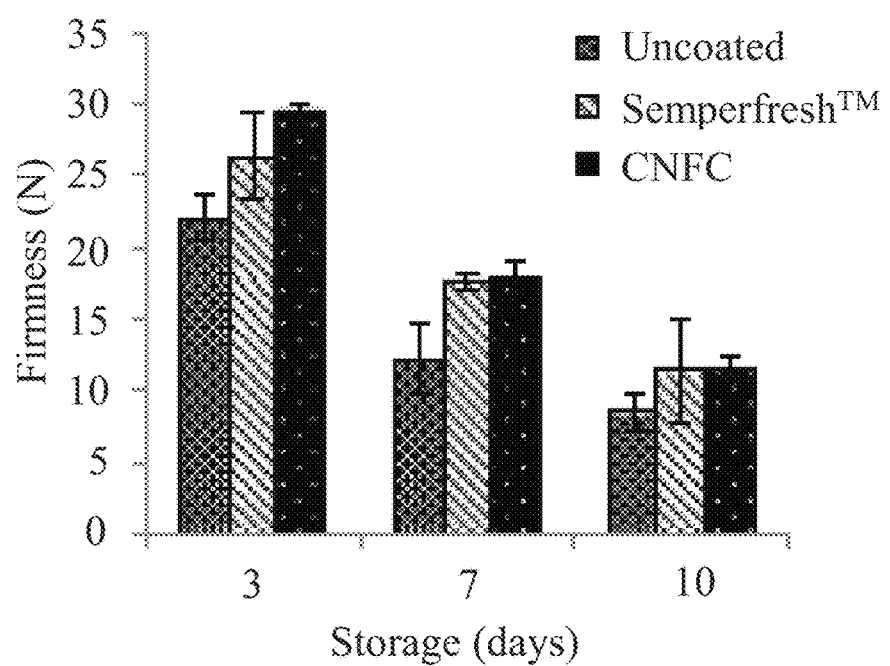
FIG. 5B is a bar graph showing comparisons between the firmness of uncoated, Semperfresh™-coated, and CNFC-coated bananas for 10 days storage at 25±2° C. and 50±5% relative humidity, wherein the CNFC-coated bananas comprised a coating formed from a composition comprising 0.3% w/w (wet basis) CNF, 1% w/w (wet basis) sucrose ester of fatty acid and 1% w/w (wet basis) oleic acid.

Both Semp-coated and CNFC-coated bananas retained higher firmness than uncoated sample at 3 and 7 days of storage (FIG. 5B). Firmness is an important parameter to determine the ripening stage and quality of banana fruit. While ripening, pectinesterase and polygalacturonase hydrolyzed the pectin and starch, leading to the destruction and deterioration of the cell wall structure, in turn softened the fruit. Based on the results reported and discussed above, CNFC coating with uniform surface coverage onto fruit surface through the interactions between CNF and epidermal cells of banana skin was able to delay physiological activity and ripening of coated fruit, thus retaining fruit firmness during storage.

Figure 5C:
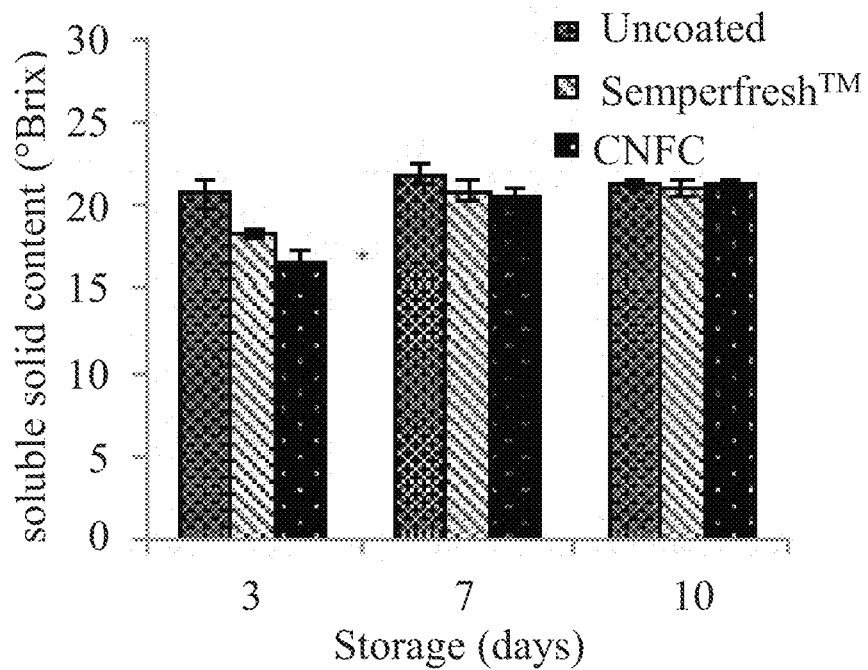
FIG. 5C is a bar graph showing comparisons between the soluble solid content of uncoated, Semperfresh™-coated, and CNFC-coated bananas for 10 days storage at 252° C. and 50±5% relative humidity, wherein the CNFC-coated bananas comprised a coating formed from a composition comprising 0.3% w/w (wet basis) CNF, 1% w/w (wet basis) sucrose ester of fatty acid and 1% w/w (wet basis) oleic acid.

CNFC coating resulted in the lowest soluble solid content of fruit in comparison with non-coated and Semp coated one at 3 and 7 d of storage (FIG. 5C). Soluble solid content is a good indicator of fruit ripening since starch is hydrolyzed into soluble sugars during ripening. The soluble solid content data proved that CNFC coating further delayed fruit ripening in comparison with Semp coating. Meanwhile, the soluble solid content of CNFC coated bananas had no significant difference from that of non-coated one at 10 days of storage, indicating that proper ripening process continued in bananas during the storage. This result was also supported by the increased ACS activity after 7 days of storage, indicating that the proper ripening continued in CNFC-coated bananas.

Figure 5D:
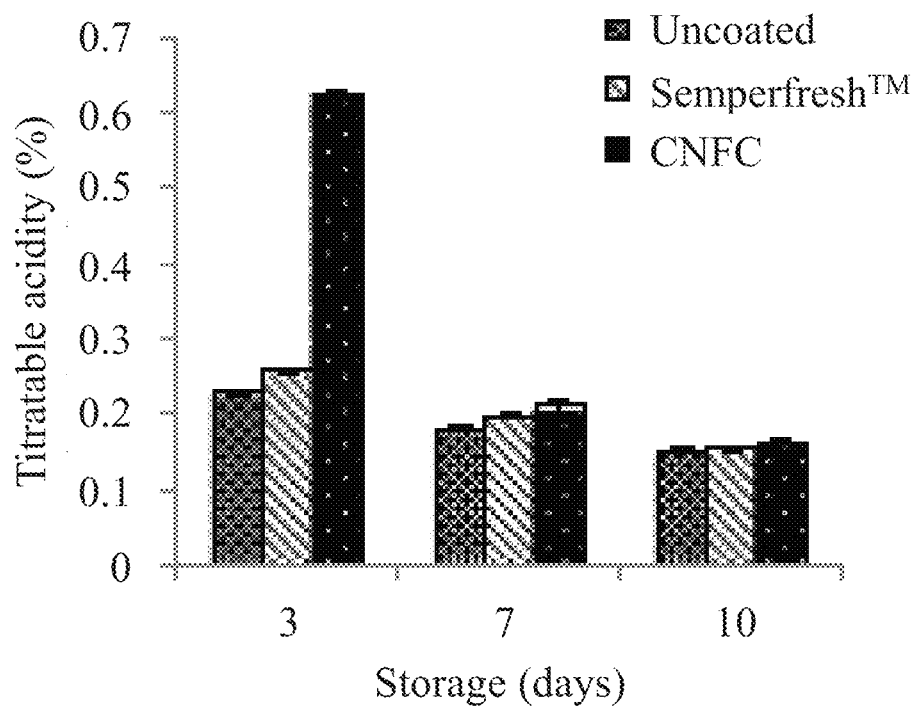
FIG. 5D is a bar graph showing comparisons between the titratable acidity of uncoated, Semperfresh™-coated, and CNFC-coated bananas for 10 days storage at 252° C. and 50±5% relative humidity, wherein the CNFC-coated bananas comprised a coating formed from a composition comprising 0.3% w/w (wet basis) CNF, 1% w/w (wet basis) sucrose ester of fatty acid and 1% w/w (wet basis) oleic acid.

TA of CNFC coated fruit was significantly (P<0.05) higher than uncoated and Semp-coated fruit throughout the 10 days of storage (FIG. 5D). It was assumed that CNFC coating reduced the consumption of organic acids as the primary substrate for respiration process during the storage due to controlled physiological activity of fruit. The validation study confirmed that CNFC coating was effective to delay ripening, retard quality deterioration, and extend the storability of postharvest bananas during ambient storage.

Example 11

In this example, the effect of CNF emulsion coatings on the appearance and selected quality parameters of various fruit at ambient storage was examined. Results are shown in FIG. 6, wherein means followed by different superscript letters between control and coated fruit are significantly different (P<0.05) and WL=weight loss.

Example 12

Figure 7:
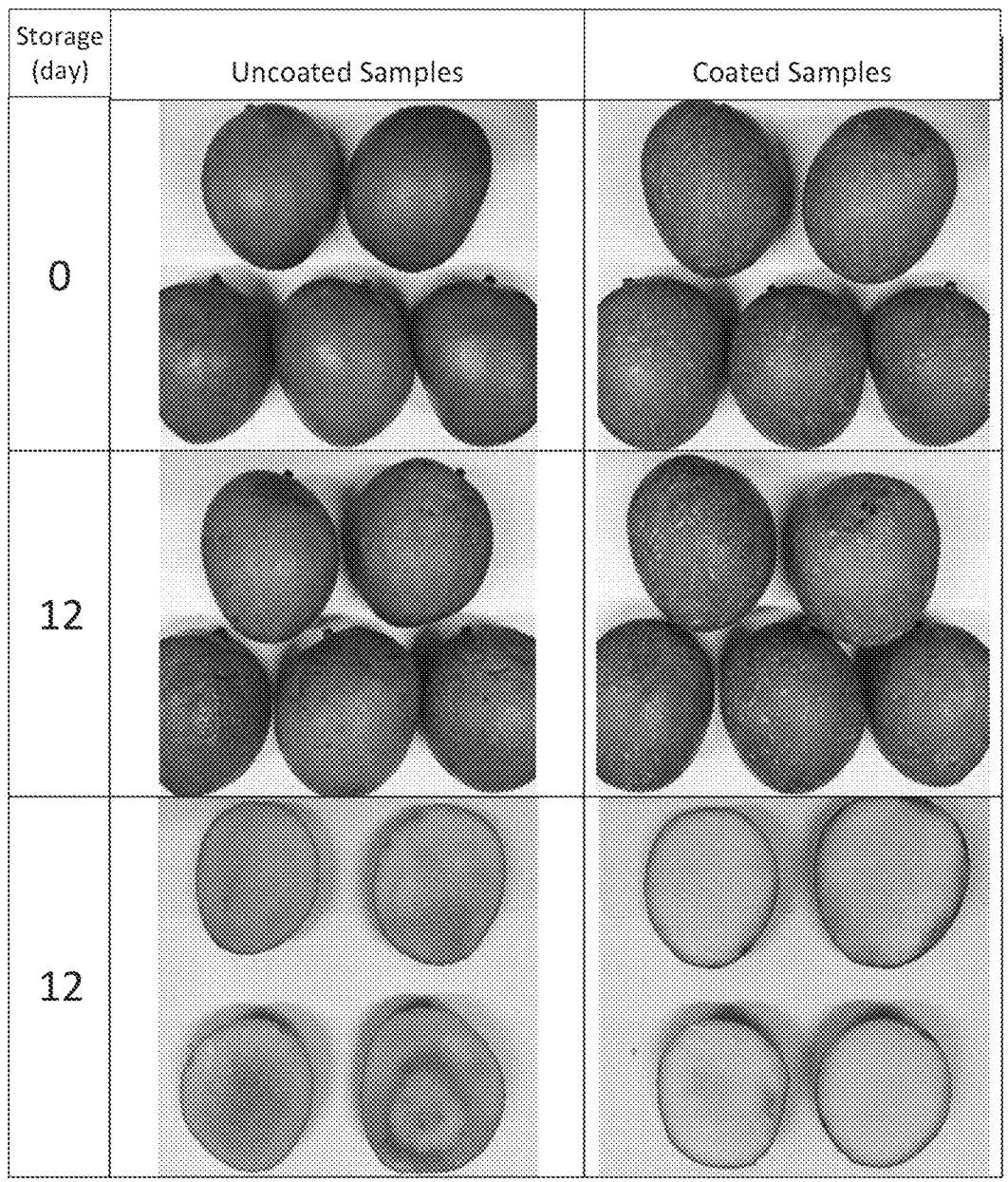
FIG. 7 shows photographic images comparing the external and internal appearance of mangos after 12 days of storage, wherein the mangos were either uncoated ("Uncoated Samples") or coated ("Coated Samples") with a coating formed from a composition comprising 0.3% w/w (wet basis) CNF, 1% w/w (wet basis) sucrose ester of fatty acid and 1% w/w (wet basis) oleic acid.

In this example, mangos were coated by using a coating composition comprising cellulose nanofibrils and an emulsion system comprising oleic acid and a sucrose ester fatty acid. The mangos were stored for 12-day of storage at the ambient condition. It was seen that coating application extended the green status and improved the storability of fruit (see FIG. 7).

Example 13

Uncoated and coated fruit were measured for weight loss, firmness, total soluble solids (TSS), and titratable acidity (TA) at 12-days of storage. Only significant (P<0.05) difference was observed for TA, showing higher in fruit with a coating embodiment disclosed herein than uncoated one. Higher TA could indicate that the fruit ripening was delayed. Results are provided below in Table 3.

TABLE 3

|  | Uncoated | OSU coating |
| --- | --- | --- |
| Weight loss (%) | $4.2 \pm 1.1^a$ | $4.3 \pm 0.9^a$ |
| Firmness (N) | $17.3 \pm 4.4^a$ | $18.4 \pm 9.4^a$ |
| TSS (%) | $10.8 \pm 0.8^a$ | $10.7 \pm 0.3^a$ |
| TA (%) | $0.20 \pm 0.04^b$ | $0.96 \pm 0.07^a$ |

Example 14

Figure 8A:
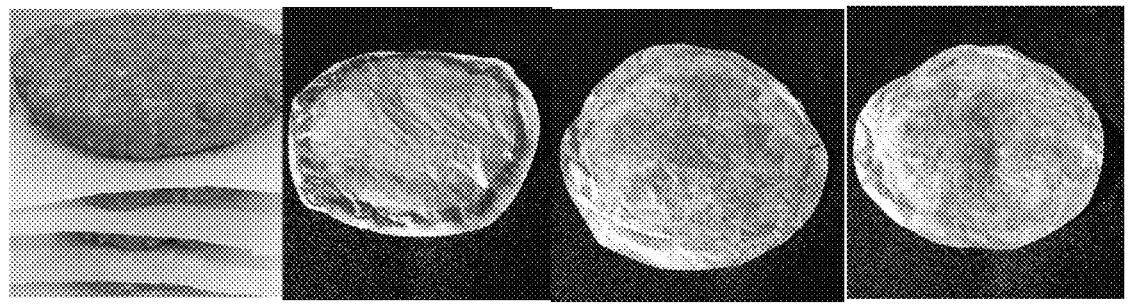
FIG. 8A provides photographic images of meat patties separated with films formed using a cellulose nanomaterial composition before storage (left-most image) and after being stored for 1 week at 5-7° C. (wherein the second image from the left uses a film comprising CNF only, the third image from the left uses a film comprising CNF modified with low molecular weight chitosan and the right most image uses a film comprising CNF and high molecular weight CNF.
Figure 8B:
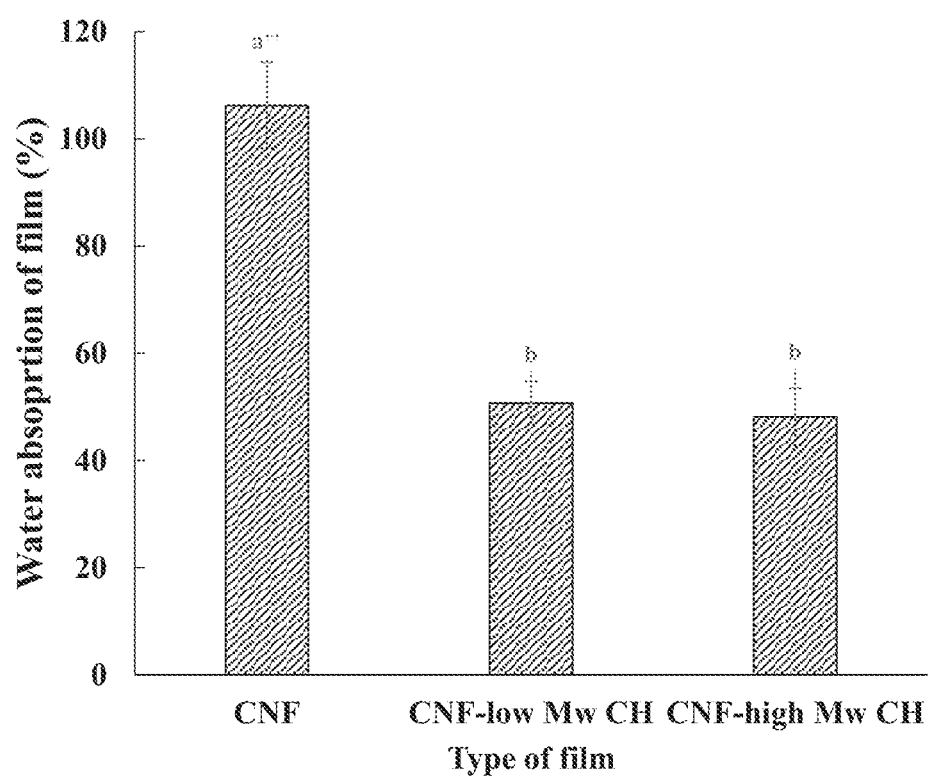
FIG. 8B is a graph of water absorption as a function of film type, wherein a control film (CNF) was compared to two different chitosan-modified films ("CNF-low Mw CH" and "CNF-high Mw CH").

In this example, films made of CH-incorporated CNF were evaluated for use as films for separating meat. Consistently, CH-incorporated CNF films (including 20% w/w dry basis CH at 68 kDa and 287 kDa) had significantly lower liquid absorption (lower WA values) than that of CNF films without CH, indicating the enhanced water resistance of CH-incorporated CNF films. These results (see FIGS. 8A and 8B) demonstrated that CH-incorporated CNF films are durable against high moisture condition so that can be potentially applied to high moist surface food as separating sheet to prevent moisture transfer between the layered products. All films, other than the control (which solely comprised CNF) were prepared by incorporating 0.5% (w/w water in wet base) CNF and 10% (w/w chitosan in dry base) glycerol.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A coating composition, consisting essentially of:
a cellulose nanomaterial in an amount ranging from 0.1% w/w wet basis to 1% w/w wet basis wherein (i) the cellulose nanomaterial comprises cellulose nanofibrils or a combination of cellulose nanofibrils and cellulose nanocrystals, and (ii) a portion of the cellulose nanomaterial comprises cellulose microfibrils, cellulose microcrystals, or a combination thereof; and
one or more emulsion droplets dispersed within a matrix comprising the cellulose nanomaterial, wherein the one or more emulsion droplets are formed by an emulsion system comprising oleic acid and a sucrose ester of a fatty acid component, wherein the oleic acid is present in an amount ranging from 0.1% w/w wet basis to 2% w/w wet basis and the sucrose ester of a fatty acid component is present in an amount ranging from 0.1% w/w wet basis to 2% w/w wet basis; and
water;
wherein
(i) the sucrose ester of a fatty acid component forms an outer hydrophilic region of the one or more emulsion droplets and the oleic acid forms an internal hydrophobic region of the one or more emulsion droplets;
(ii) the cellulose nanomaterial and the emulsion system are present at a ratio ranging from 1:1 to 1:8 (cellulose nanomaterial:emulsion system); and
(iii) the coating composition provides a coating that exhibits a water vapor permeability value ranging from 0.03 g ml/m$^2$ d Pa to less than 0.15 g ml/m$^2$ d Pa.

2. The coating composition of claim 1, wherein the cellulose nanomaterial comprises cellulose nanofibrils.

3. The coating composition of claim 2, wherein the cellulose nanofibrils are present in an amount ranging from 0.1% w/w wet basis to 0.5% w/w wet basis.

4. The coating composition of claim 1, wherein the cellulose nanomaterial comprises cellulose nanocrystals.

5. The coating composition of claim 4, wherein the cellulose nanocrystals are present in an amount ranging from 0.1% w/w wet basis to 1% w/w wet basis.

6. A substantially dried coating,
formed from the coating composition of claim 1.

7. The substantially dried coating of claim 6, wherein the cellulose nanomaterial is present in an amount ranging from greater than 1% w/w dry basis to less than 84% w/w dry basis when the dried coating comprises greater than 0% to 10% moisture, or wherein the fatty acid component is present in an amount ranging from greater than 2% w/w dry basis to less than 97% w/w dry basis when the dried coating comprises greater than 0% to 10% moisture, or wherein the sucrose ester of a fatty acid component is present in an amount ranging from greater than 1% w/w dry basis to less than 91% w/w dry basis when the dried coating comprises greater than 0% to 10% moisture.

8. The substantially dried coating of claim 6, wherein the cellulose nanomaterial comprises cellulose nanofibrils.

9. The substantially dried coating of claim 6, wherein the cellulose nanomaterial comprises cellulose nanocrystals.

10. A plant part, comprising the substantially dried coating of claim 6.

11. The plant part of claim 10, wherein the plant part is a tropical fruit.

12. The plant part of claim 10, wherein the plant part is a banana, a papaya, an avocado, a melon, or a mango.

13. The plant part of claim 10, wherein the plant part is a banana.

14. A method, comprising coating or substantially coating a plant or a plant part with the coating composition of claim 1.

15. The coating composition of claim 1, wherein the portion of the cellulose nanomaterial comprises the cellulose microfibrils.

16. The coating composition of claim 2, wherein the portion of the cellulose nanomaterial comprises the cellulose microfibrils.

17. The coating composition of claim 3, wherein the portion of the cellulose nanomaterial comprises the cellulose microfibrils.

18. The coating composition of claim 4, wherein the portion of the cellulose nanomaterial comprises the cellulose microfibrils.

19. The coating composition of claim 5, wherein the portion of the cellulose nanomaterial comprises the cellulose microfibrils.

20. The coating composition of claim 6, wherein the portion of the cellulose nanomaterial comprises the cellulose microfibrils.

21. The coating composition of claim 7, wherein the portion of the cellulose nanomaterial comprises the cellulose microfibrils.

22. The coating composition of claim 1, wherein an amount of the cellulose microfibrils present in the coating composition is reduced or increased by (i) modifying an extraction method used to make the cellulose nanomaterial; and/or (ii) varying a cellulose-containing species from which the cellulose microfibrils are extracted.

23. The substantially dried coating of claim 8, wherein the portion of the cellulose nanomaterial comprises the cellulose microfibrils.

24. The substantially dried coating of claim 9, wherein the portion of the cellulose nanomaterial comprises the cellulose microfibrils.

25. The plant part of claim 10, wherein the portion of the cellulose nanomaterial comprises the cellulose microfibrils.

26. The plant part of claim 11, wherein the portion of the cellulose nanomaterial comprises the cellulose microfibrils.

27. The plant part of claim 12, wherein the portion of the cellulose nanomaterial comprises the cellulose microfibrils.

28. The method of claim 14, wherein the portion of the cellulose nanomaterial comprises the cellulose microfibrils.

* * * * *